US012797778B2

(12) United States Patent
Mason

(10) Patent No.: US 12,797,778 B2
(45) Date of Patent: Nov. 17, 2026

(54) WATER SEDIMENT FILTER ASSEMBLY

(71) Applicant: NIBCO Inc., Elkhart, IN (US)

(72) Inventor: Christopher W. Mason, Granger, IN (US)

(73) Assignee: NIBCO Inc., Elkhart, IN (US)

( * ) Notice: Subject to any disclaimer, the term of this patent is extended or adjusted under 35 U.S.C. 154(b) by 431 days.

(21) Appl. No.: 18/397,250

(22) Filed: Dec. 27, 2023

(65) Prior Publication Data

US 2024/0123375 A1 Apr. 18, 2024

Related U.S. Application Data

(63) Continuation-in-part of application No. 17/592,034, filed on Feb. 3, 2022, now Pat. No. 12,303,811.

(51) Int. Cl.

*B01D 29/23* (2006.01)
*B01D 29/92* (2006.01)
*B01D 35/30* (2006.01)

(52) U.S. Cl.

CPC ............ *B01D 29/23* (2013.01); *B01D 29/92* (2013.01); *B01D 35/30* (2013.01)

(58) Field of Classification Search

CPC ........ B01D 29/23; B01D 29/92; B01D 35/30; B01D 2201/0415; B01D 2201/0423; B01D 2201/165; B01D 29/606; B01D 29/94; B01D 35/147; B01D 35/1573; B01D 35/16; B01D 29/15; F16K 11/0876; F16K 27/067; C02F 2201/005; C02F 2307/14; C02F 1/001

See application file for complete search history.

(56) References Cited

U.S. PATENT DOCUMENTS

| | | | |
|---|---|---|---|
| 5,181,539 A | 1/1993 | Yokoyama | |
| 5,269,913 A | 12/1993 | Atkins | |
| 5,531,244 A | 7/1996 | Siver | |
| 6,186,174 B1 | 2/2001 | Yurchision et al. | |
| 6,625,824 B1 | 9/2003 | Lutz et al. | |
| 2002/0008068 A1 | 1/2002 | Anderson | |
| 2006/0237359 A1* | 10/2006 | Lin ...................... | F16K 11/085 210/438 |
| 2010/0012561 A1 | 1/2010 | Clappison | |

FOREIGN PATENT DOCUMENTS

| | | |
|---|---|---|
| CN | 2042475648 | 4/2015 |
| CN | 106139666 | 11/2016 |
| CN | 207203629 | 4/2018 |

(Continued)

OTHER PUBLICATIONS

AO Smith, Whole House Water Filter—Valve-in-Head System, https://aosmithatlowes.com/products/water-filters/whole-home/ao-wh-prev/ (Aug. 27, 2021).

(Continued)

*Primary Examiner* — Bobby Ramdhanie
*Assistant Examiner* — Boi-Lien Thi Nguyen
(74) *Attorney, Agent, or Firm* — PRICE HENEVELD LLP

(57) ABSTRACT

A water sediment filter assembly includes a screen member and a drain port which permits the removal of collected debris. The water sediment filter assembly includes a valve member which can be moved to different positions to permit the draining of collected sediment through the drain port.

20 Claims, 33 Drawing Sheets

(56) References Cited

FOREIGN PATENT DOCUMENTS

| | | |
|---|---|---|
| CN | 109764159 | 5/2019 |
| CN | 209934245 | 1/2020 |
| CN | 112337166 | 2/2021 |
| CN | 112340904 | 2/2021 |
| DE | 4424232 | 5/1995 |
| EP | 1689505 | 7/2008 |
| KR | 102000229 | 7/2019 |
| NZ | 522913 | 2/2004 |
| WO | 2007082033 | 7/2007 |

OTHER PUBLICATIONS

Culligan, WH-S200-C Whole House Sediment Water Filter, https://www.amazon.com/CULLIGAN-WH-S200-C-Whole-Sediment-Filter/dp/B01JIRHRBK (Aug. 27, 2021).
Elegant Casa, Elegant Casa ¾" Water Pre Filter for Overhead Tank Sediment Filter Alternative Descaler for Rust & Sand Removal, https://www.amazon.in/ELEGANT-CASA-Overhead-Sediment-Alternative/dp/B07XHK7GHY (Aug. 27, 2021).
Homyl, Homyl Whole House Water Pre-Filter System Water Sediment Filter Stainless Steel Filter Mesh for Tap Water Well Water Purifying, ¾", ½" Port, https://www.amazon.in/Homyl-Pre-Filter-Stainless-Purifying/dp/B07HTWM1PG (Aug. 27, 2021).
Ispring, iSpring WSP-50 Reusable Whole House Spin Down Sediment Water Filter 50 Micron, 1" MNPT + ¾" FNPT, https://www.amazon.in/iSpring-WSP-50-Reusable-Sediment-Filter/dp/B072YVNRZN?th=1 (Aug. 27, 2021).
Rainfresh, Whole House Filter With Bypass Valve, https://rainfresh.ca/producys/whole-house-filter-with-bypass-valve/ (Aug. 27, 2021).
Washington State Department of Health, Lead and Drinking Water, 1997, pp. 1-2 (1997).

* cited by examiner

WATER SEDIMENT FILTER ASSEMBLY

CROSS REFERENCE TO RELATED APPLICATION AND CLAIM TO PRIORITY

The present application is a continuation-in-part application of commonly assigned, U.S. Pat. No. 12,303,811 issued May 20, 2025, which is incorporated herein by reference and claim priority thereto under 35 U.S.C. § 120.

BACKGROUND OF THE INVENTION

The present invention relates to a water sediment filter assembly. Water within a plumbing system can contain sediment which can cause damage to plumbing components including valves, piping, and appliances. Water sediment filter assemblies exist to screen sediment out of the water that enters the filter assembly before the screened water exits the filter assembly. The collection of sediment may require that the incoming and outgoing water supply be closed and the water sediment filter assembly disassembled in order to clean out the accumulated sediment. Some water sediment filter assemblies utilize drain ports in order to empty the accumulated sediment from the water sediment filter assembly. However, again, this can require the shutting off of the water supply leading to the filter assembly to clean out the accumulated sediment. Thus, a water sediment filter assembly that permits the easy clearing of the accumulated sediment through a drain port, without having to shut off the water supply going to and/or coming from the water sediment filter assembly would be advantageous.

SUMMARY OF THE INVENTION

One aspect of the present invention is a water sediment filter assembly that includes a housing having an upper section and a lower section. The lower section is removably coupled to the upper section. The upper section has a first port and an oppositely disposed second port with a flow diversion member positioned adjacent to the first port. The upper section also includes oppositely disposed third and fourth ports with an intersection point where the centerlines of the first, second, third, and fourth ports intersect. The lower section of the housing includes an open cavity that receives a screen member positioned in the cavity. The flow diversion member of the upper section directs fluid entering the upper section from the first port into the open cavity of the lower section. A first valve member is located in the upper section with a ball member positioned at the intersection point. The ball member includes a stem portion and a ball portion. The ball portion includes a lower end surface with a first opening that is in fluid communication with the cavity of the screen member. The ball portion also includes a central section positioned within the intersection point of the upper section. The central section has a second opening and smaller, oppositely disposed third and fourth openings. The lower section also includes a drain port with a second valve member coupled to the drain port. A handle is coupled to the stem portion of the ball member to permit the first valve member to be in different positions. When the first valve member is in a first position, the second opening of the ball member is aligned with the second port, permitting fluid flow from the first port through the screen member to the first opening in the lower end surface of the ball member to the second port. In the first position, the third opening in the ball member is aligned with the third port and the fourth opening is aligned with the fourth port. When the first valve member is in a second position, the second opening of the ball member is aligned toward the first port, thereby blocking flow to the second port, while the third opening in the ball member is aligned with the fourth port, and the fourth opening in the ball member is aligned with the third port.

Yet another aspect of the present invention is a water sediment filter assembly with a housing having an upper section and a lower section that is removably coupled to the upper section. The upper section has a first port which is disposed opposite a second port. The lower section includes an open cavity with a drain port. A first valve member is located in the upper section with a ball member positioned between the first port and the second port. The ball member includes a stem portion and a ball portion. The ball portion includes a lower end surface with a first lower opening and a second lower opening. The ball portion also has a central section with five central openings. A screen member is positioned in the cavity of the lower section of the housing. The screen member includes a cavity section that is in fluid communication with the second lower opening on the ball portion of the ball member. A handle is coupled to the stem portion of the ball member. When the first valve member is in the first position, one of the five central openings in the ball member is aligned with the first port and one of the five central openings is aligned with the second port, permitting fluid flow from the first port into the lower section through the first lower opening in the ball member, through the screen member, and then through the second lower opening in the ball member to the second port.

Yet another aspect of the present invention is a water sediment filter assembly with a housing having an upper section and a lower section that is removably coupled to the upper section. The upper section has a first port and an oppositely disposed second port. The lower section includes an open cavity with a screen member that is positioned in the cavity. The lower section also has a drain port. A first valve member is located in the upper section with a ball member positioned between the first port and second port. The ball member includes a stem portion and a ball portion. The ball portion includes a lower end surface with a first lower opening and a second lower opening and a central section having at least four central openings. The screen member includes a cavity section that is in fluid communication with the second lower opening on the ball member. A second valve member is coupled to the drain port. A handle is coupled to the stem portion of the first valve member. When the first valve member is in a first position, one of the at least four central openings is aligned with the first port and another of the central openings is aligned with the second port, permitting fluid flow from the first port into the lower section through the first lower opening, through the screen member, through the second lower opening in said ball member, and to the second port.

These and other features, advantages, and objects of the present invention will be further understood and appreciated by those skilled in the art by reference to the following specification, claims, and appended drawings.

DETAILED DESCRIPTION

For purposes of description herein, the terms "upper," "lower," "right," "left," "rear," "front," "vertical," "horizontal," and derivatives thereof shall relate to the invention as oriented in Figures. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
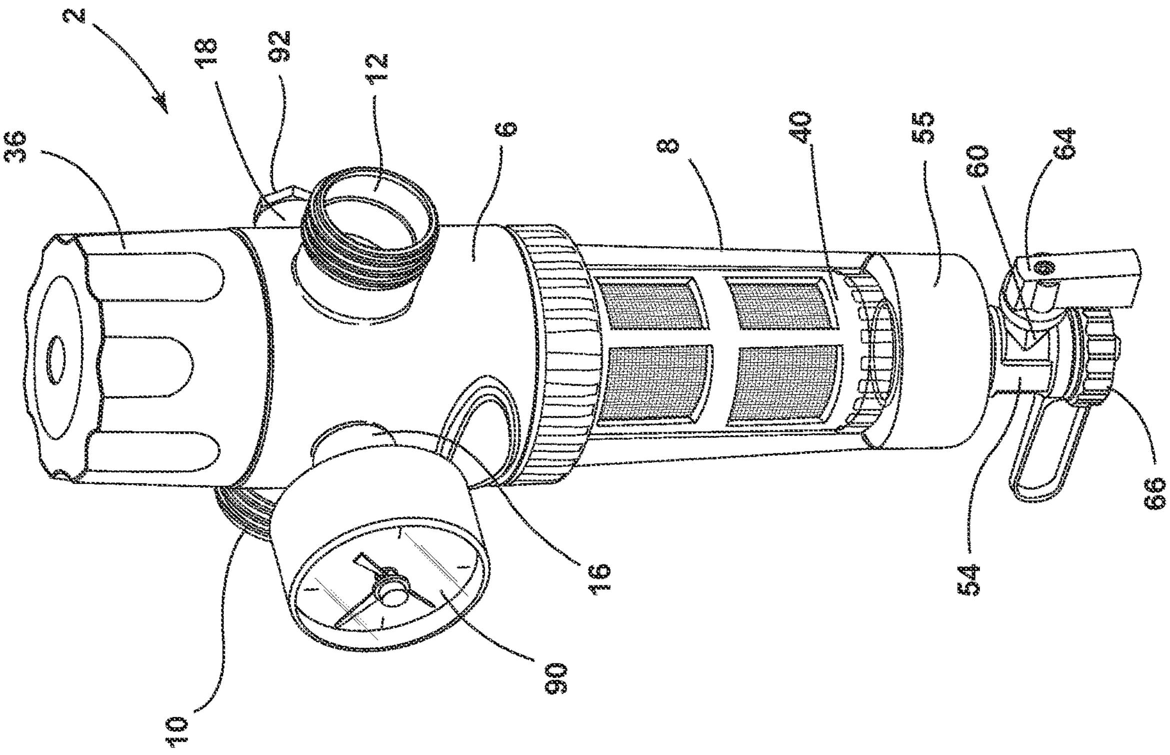
FIG. 1 is a front perspective view of a water sediment filter assembly according to one aspect of the present invention.
Figure 2:
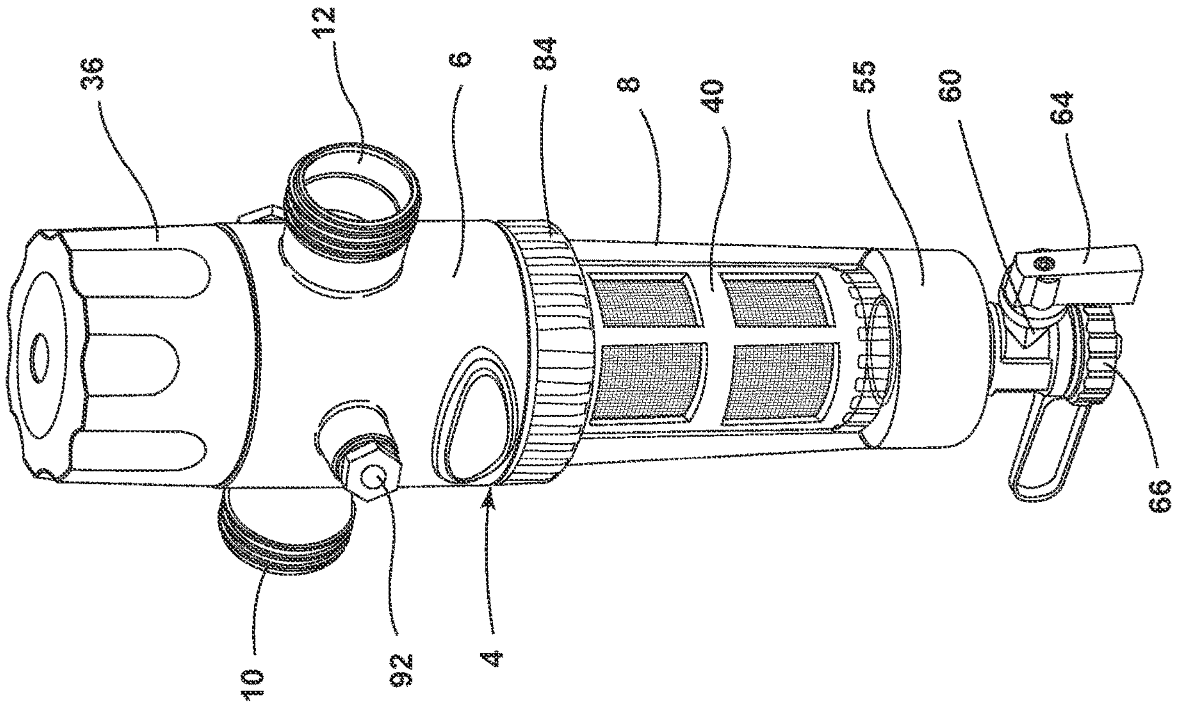
FIG. 2 is a front perspective view of the water sediment filter assembly shown in FIG. 1 with the gauge removed.
Figure 3:
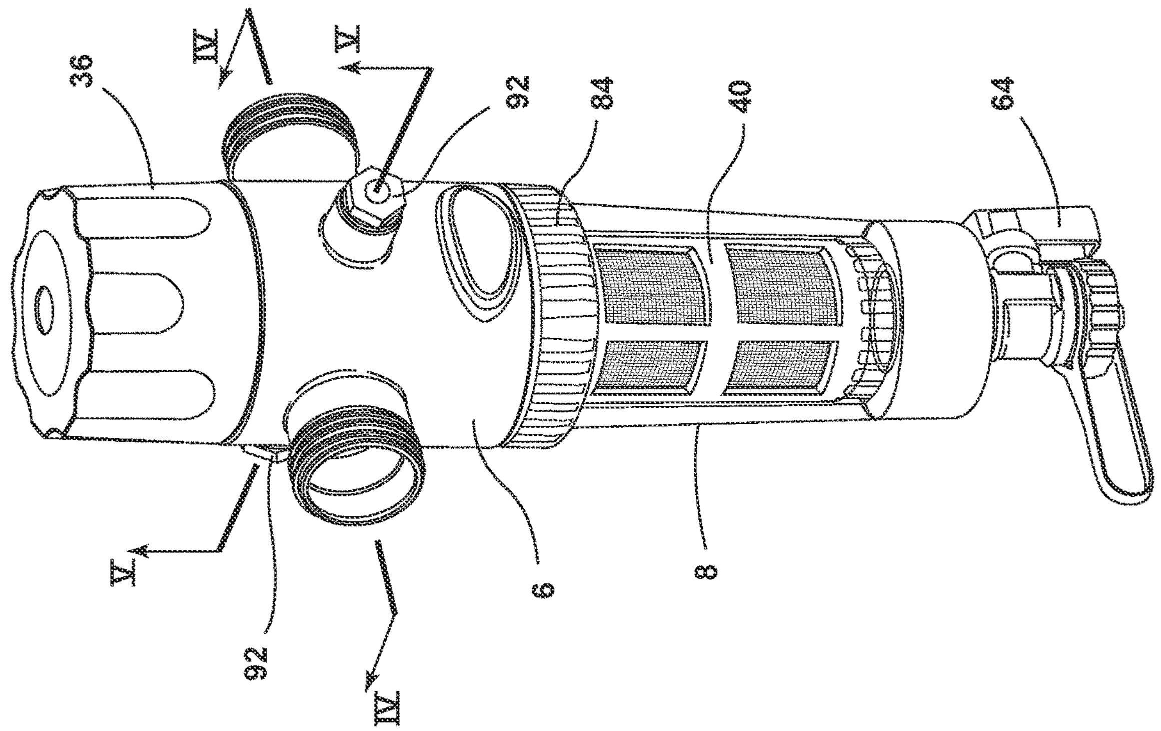
FIG. 3 is a side perspective view of the water sediment filter assembly shown in FIG. 1 with the gauge removed.
Figure 6:
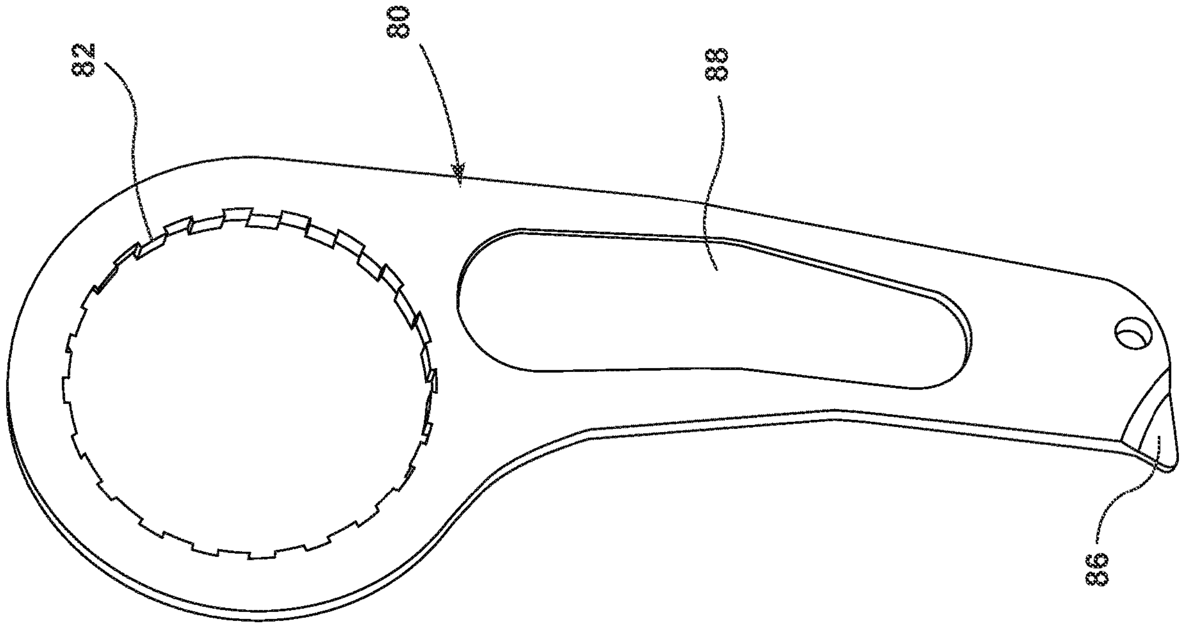
FIG. 6 is a top perspective view of a tool used to remove the lower section from the upper section of the water sediment filter assembly.
Figure 7:
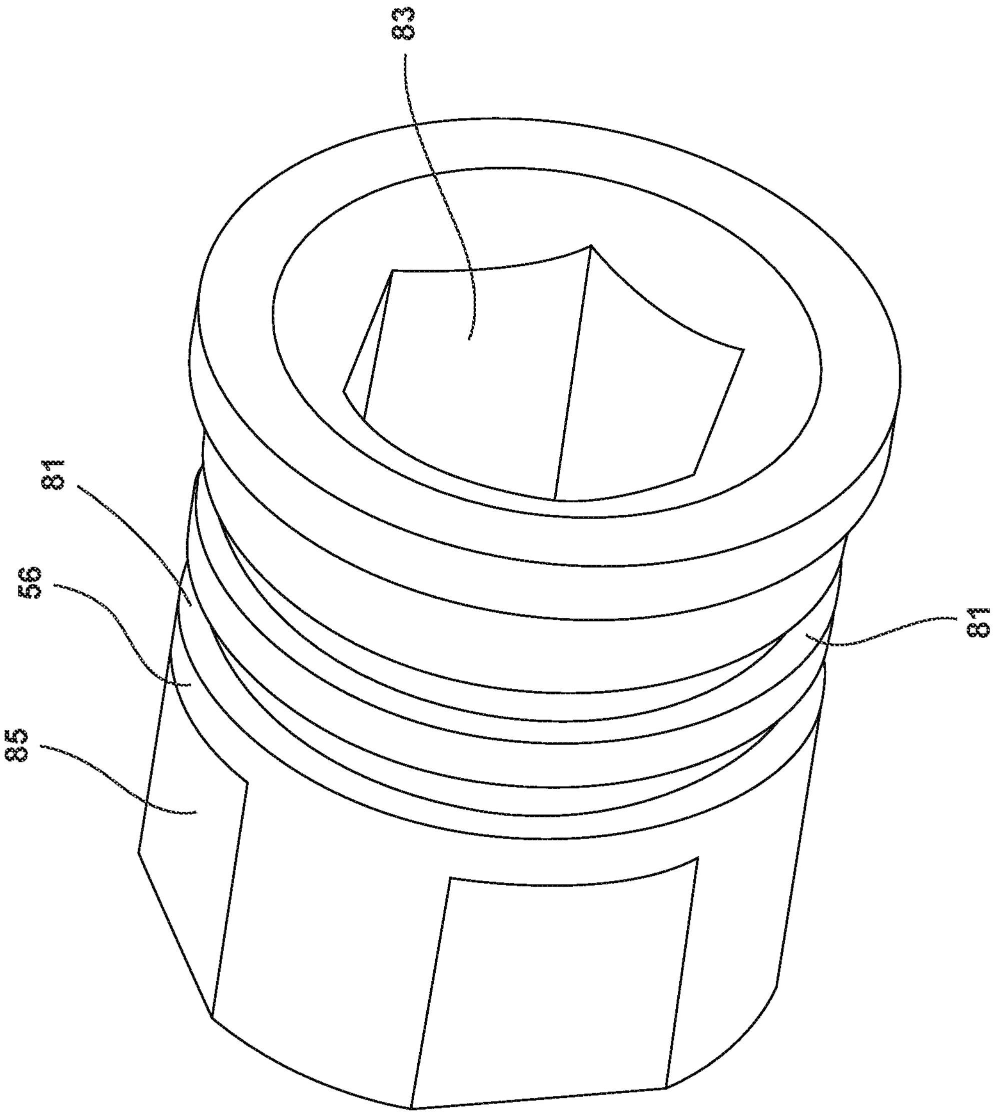
FIG. 7 is a side perspective view of the drain port body of the lower section of the water sediment filter assembly.

A water sediment filter assembly 2 is shown in FIG. 1. The water sediment filter assembly 2 includes a housing 4 which has an upper section 6 and a lower section 8. The lower section 8 is removably coupled to the upper section 6. For example, the lower section 8 can include a threaded surface which correspondingly mates with a threaded surface on the upper section 6. Other coupling means can be used in place of or in addition to a threaded coupling. The installation and removal of the lower section 8 to the upper section 6 can be facilitated by the use of tool 80, shown in FIG. 6. The tool 80 has a textured surface 82 that engages a textured surface 84 on the lower section 8 to assist in the rotation of lower section 8 with respect to upper section 6. The tool 80 also has an end portion 86 and an opening 88 that can be used to help remove or install other components of the water sediment filter assembly 2, such as the gauge 90, plug 92, or drain port 54 by engaging surfaces of the components.

Figure 4:
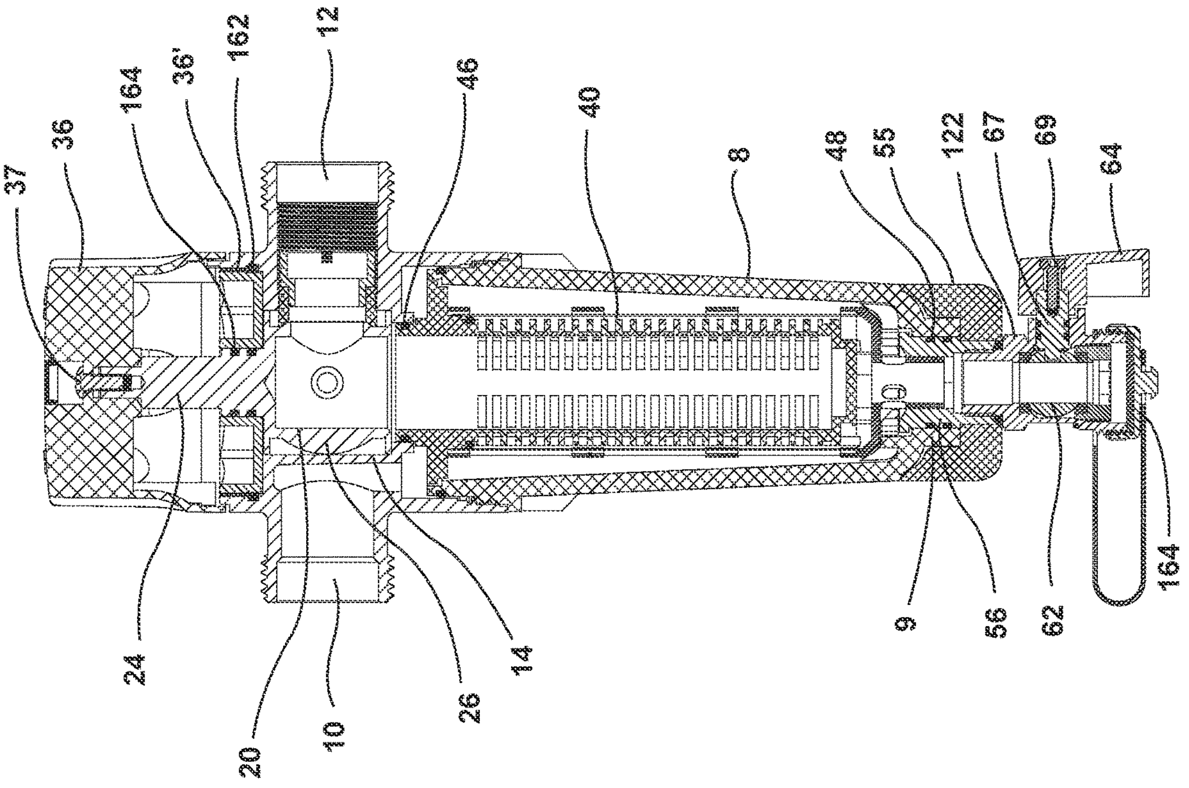
FIG. 4 is a cross-sectional view of the water sediment filter assembly taken along section IV shown in FIG. 3.
Figure 5:
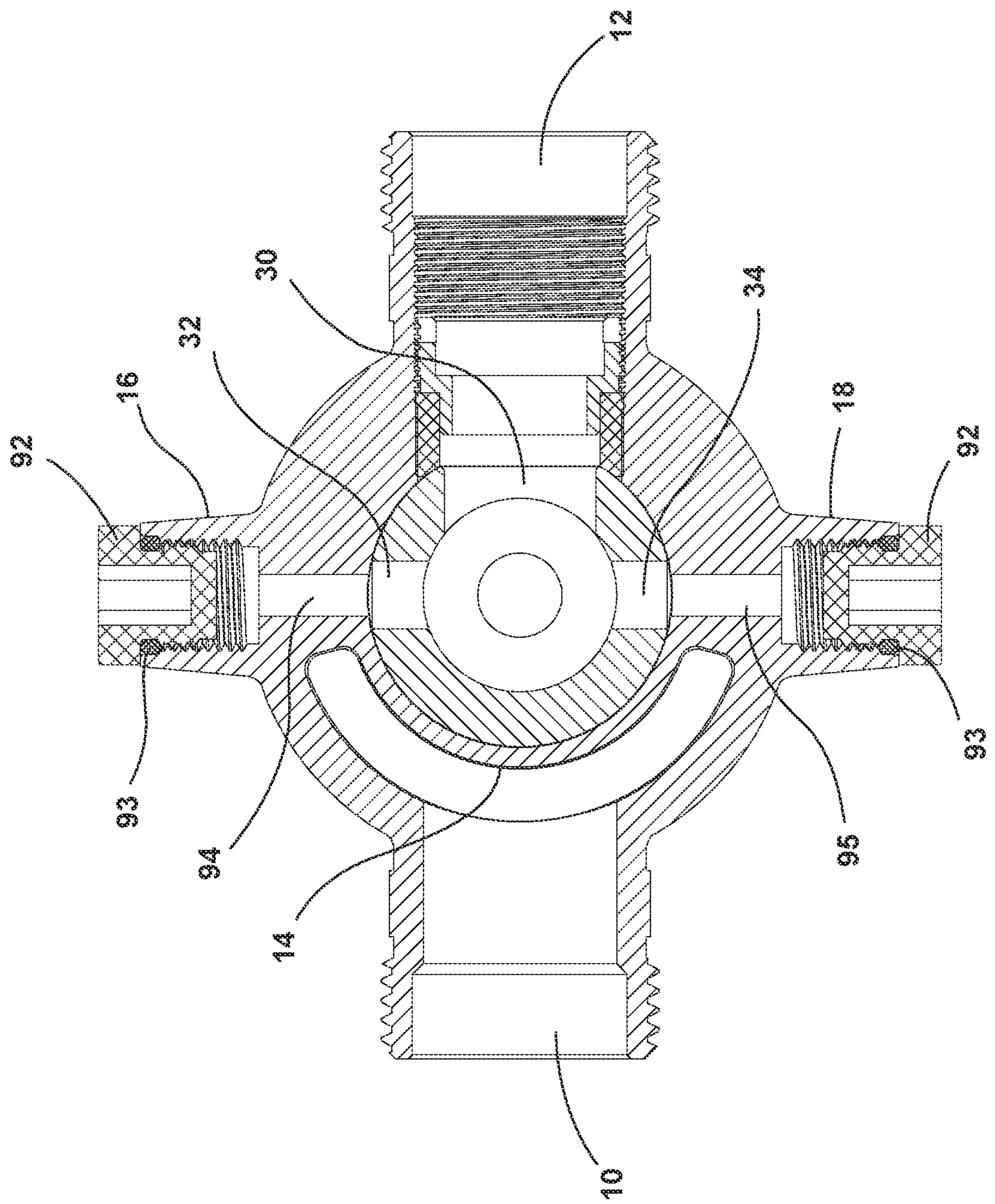
FIG. 5 is a cross-sectional view of the water sediment filter assembly taken along section V shown in FIG. 3.

The upper section 6 includes a first port 10 and a second port 12. In the illustrated embodiment, the second port 12 is positioned generally opposite the first port 10. The first port 10 receives a supply of incoming water, and the second port 12 is coupled to the outgoing piping/tubing that is connected to the water sediment filter assembly 2. As shown in FIG. 4, a flow diversion member 14 is located adjacent to the first port 10. The flow diversion member 14 directs the incoming water to the lower section 8 of the water sediment filter assembly 2. In the illustrated embodiment, the upper section 6 also includes a third port 16 and a fourth port 18. In the illustrated embodiment, the third port 16 and fourth port 18 are disposed generally opposite each other.

The lower section 8 includes a transparent or mostly transparent section that permits the viewing of at least a portion of the interior of the lower section 8. This permits the viewing of the screen member 40 as well as the accumulation of any sediment in lower section 8.

A first valve member 20 is positioned within the upper section 6 at the intersection point of the centerlines of the first port 10, the second port 12, third port 16, and fourth port

Figure 19:
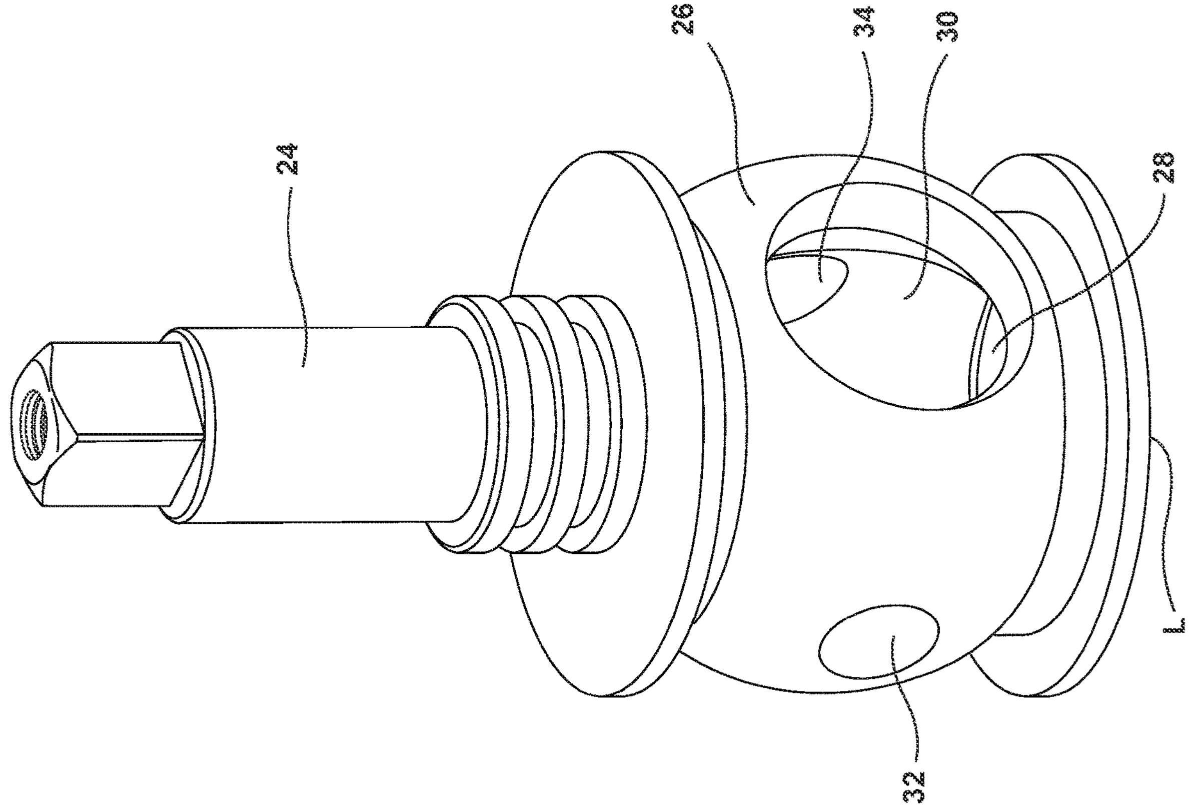
FIG. 19 is a front perspective view of the ball member of the first valve member of the water sediment filter assembly shown in FIG. 1.
Figure 20:
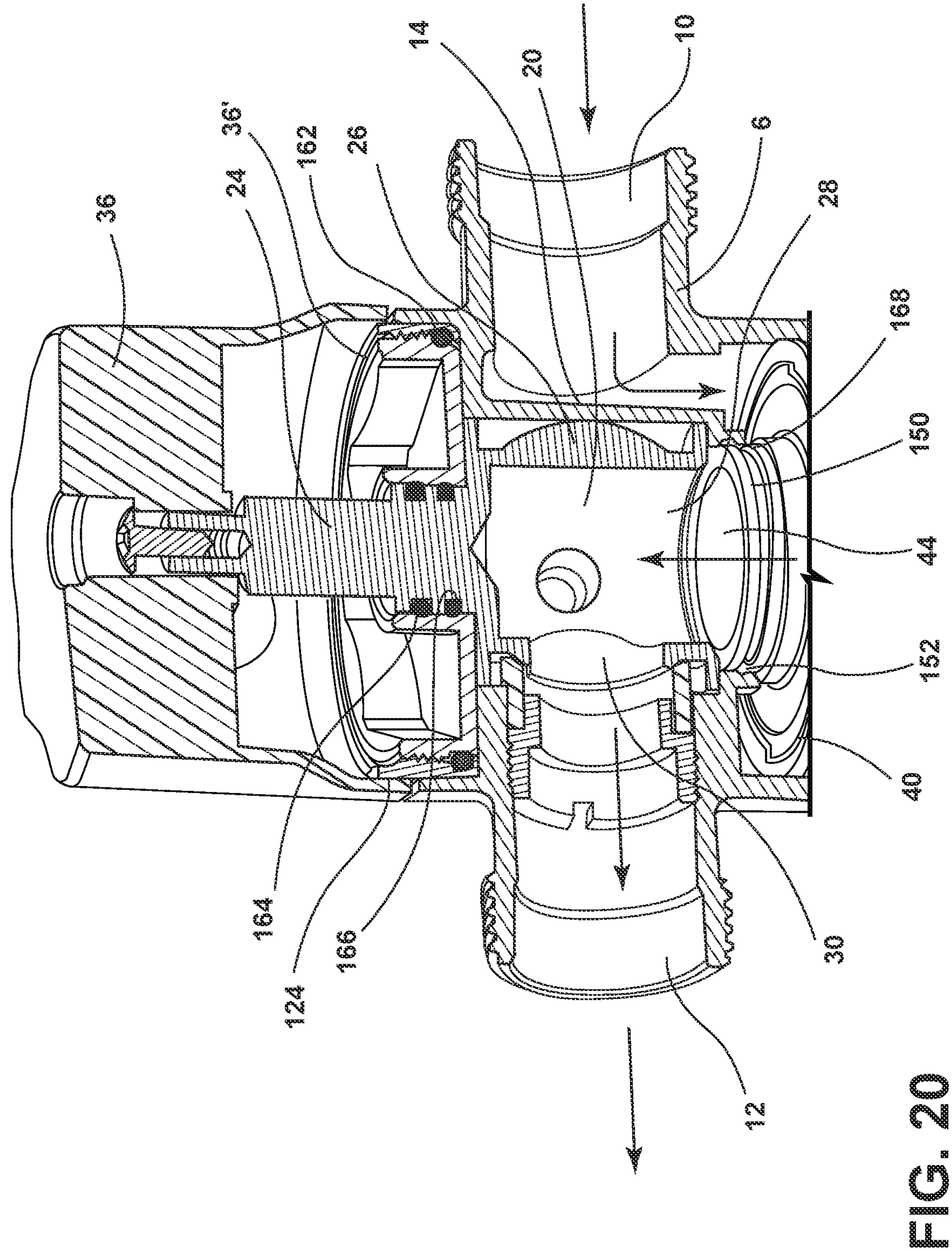
FIG. 20 is a partial cross-sectional view of the water sediment filter assembly of FIG. 1, showing the direction of fluid flow.

18. The first valve member 20 includes a ball member 22. The ball member 22 has a stem portion 24 and a ball portion 26. The ball portion 26 includes a first opening 28 that is located on the lower surface L of the ball portion 26, as illustrated in FIG. 19. The ball portion 26 also includes a second opening 30, a third opening 32, and a fourth opening 34. As illustrated in FIG. 19, the third opening 32 and fourth opening 34 can be positioned opposite each other. The first valve member 20 includes a handle 36 that is coupled to the stem portion 24 of ball member 22, as illustrated in FIG. 20.

A screen member 40 is positioned within the cavity of the lower section 8 of the housing 4 of the water sediment filter assembly 2. The screen member 40 includes a body 41 that surrounds screen 42. The screen 42 is made from a mesh material. The size of the openings and material used for the mesh can vary depending upon the desired degree of the screening of the water. In the illustrated embodiment, the mesh is a metal material. The body 41 of the screen member 40 can be made of any suitable material, including, but not limited to, a polymeric material. Openings 43 and the body 41 provide an area for the water to pass by the body 41 to the screen 42. The screen member 40 includes a cavity section 44.

Figure 8:
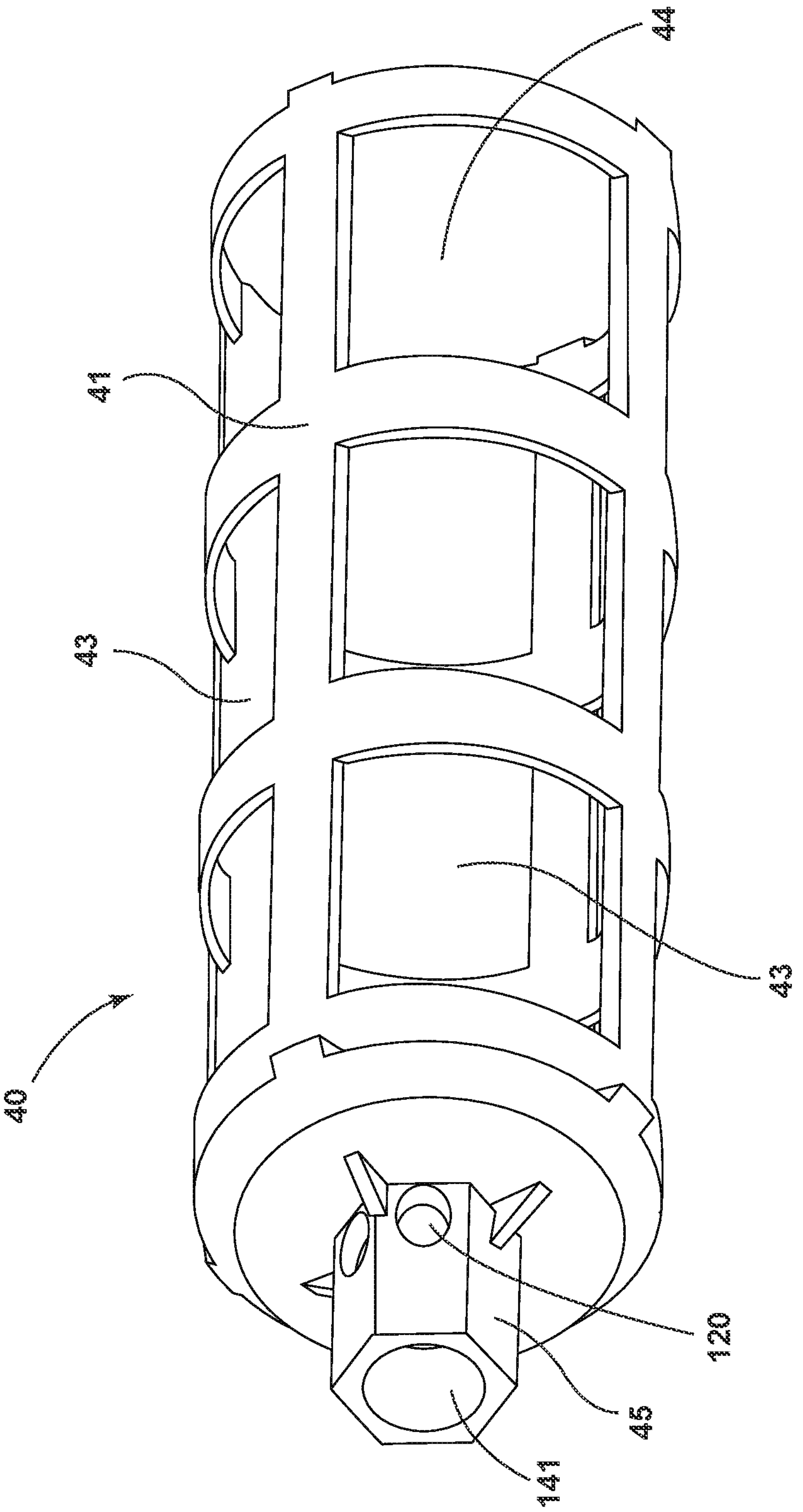
FIG. 8 is a side perspective view of the screen member body of the lower section of the water sediment filter assembly.
Figure 10:
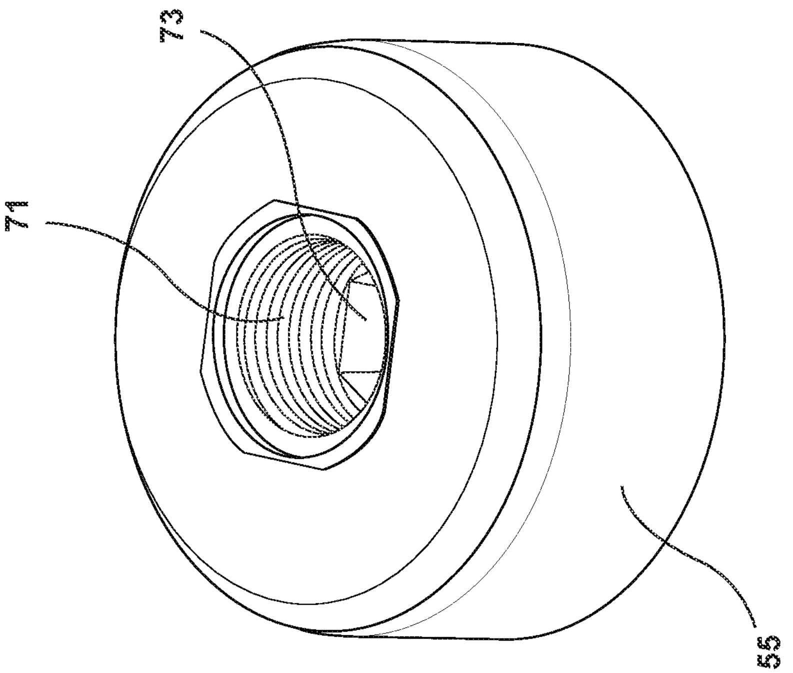
FIG. 10 is a bottom perspective view of the drain port surround shown in FIG. 9 with the drain port body.
Figure 9:
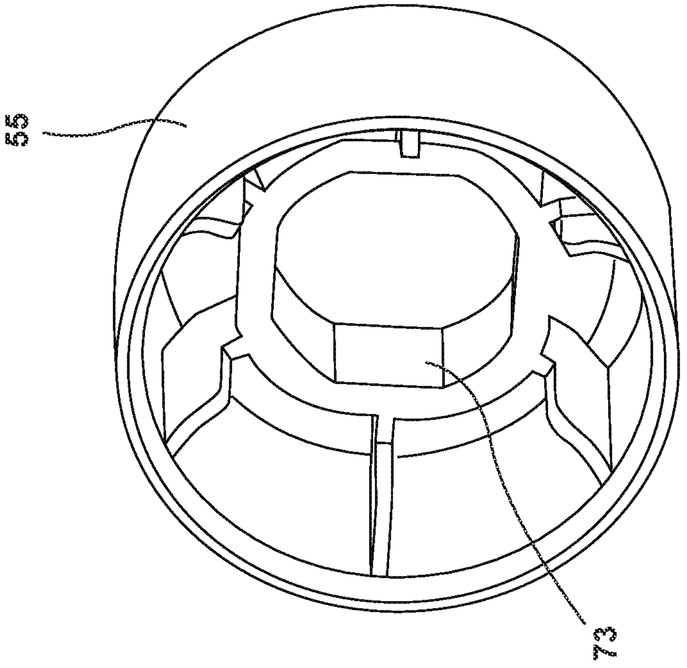
FIG. 9 is a top perspective view of the drain port surround of the lower section of the water sediment filter assembly.
Figure 11:
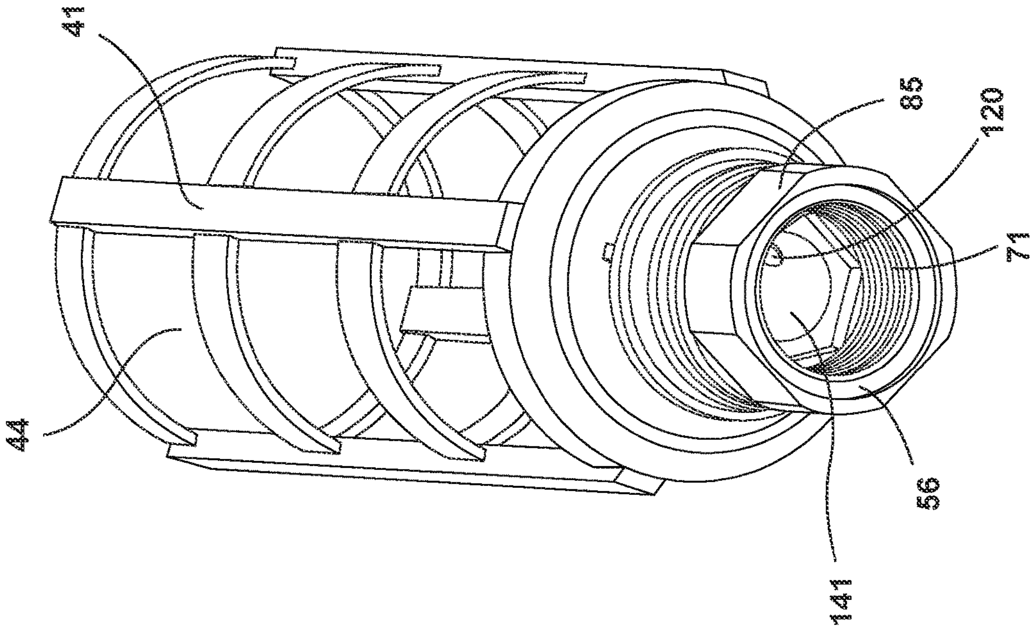
FIG. 11 is a bottom perspective view of the screen member with the drain port body.
Figure 12:
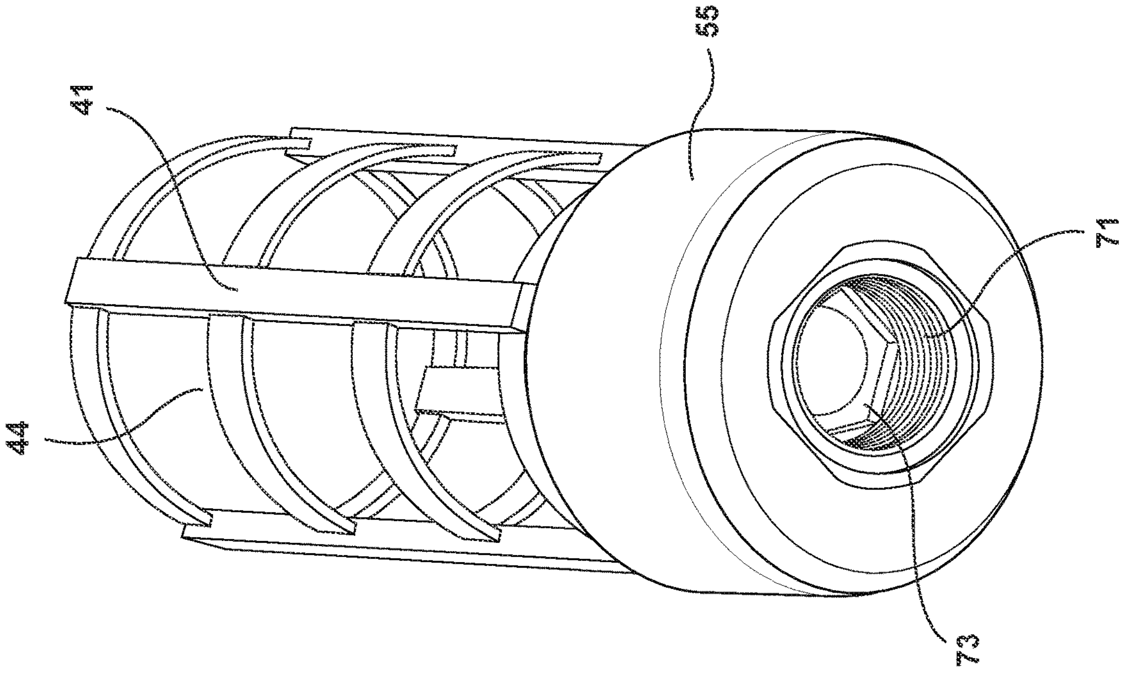
FIG. 12 is a bottom perspective view of the screen member with the drain port body and the drain port surround.
Figure 13:
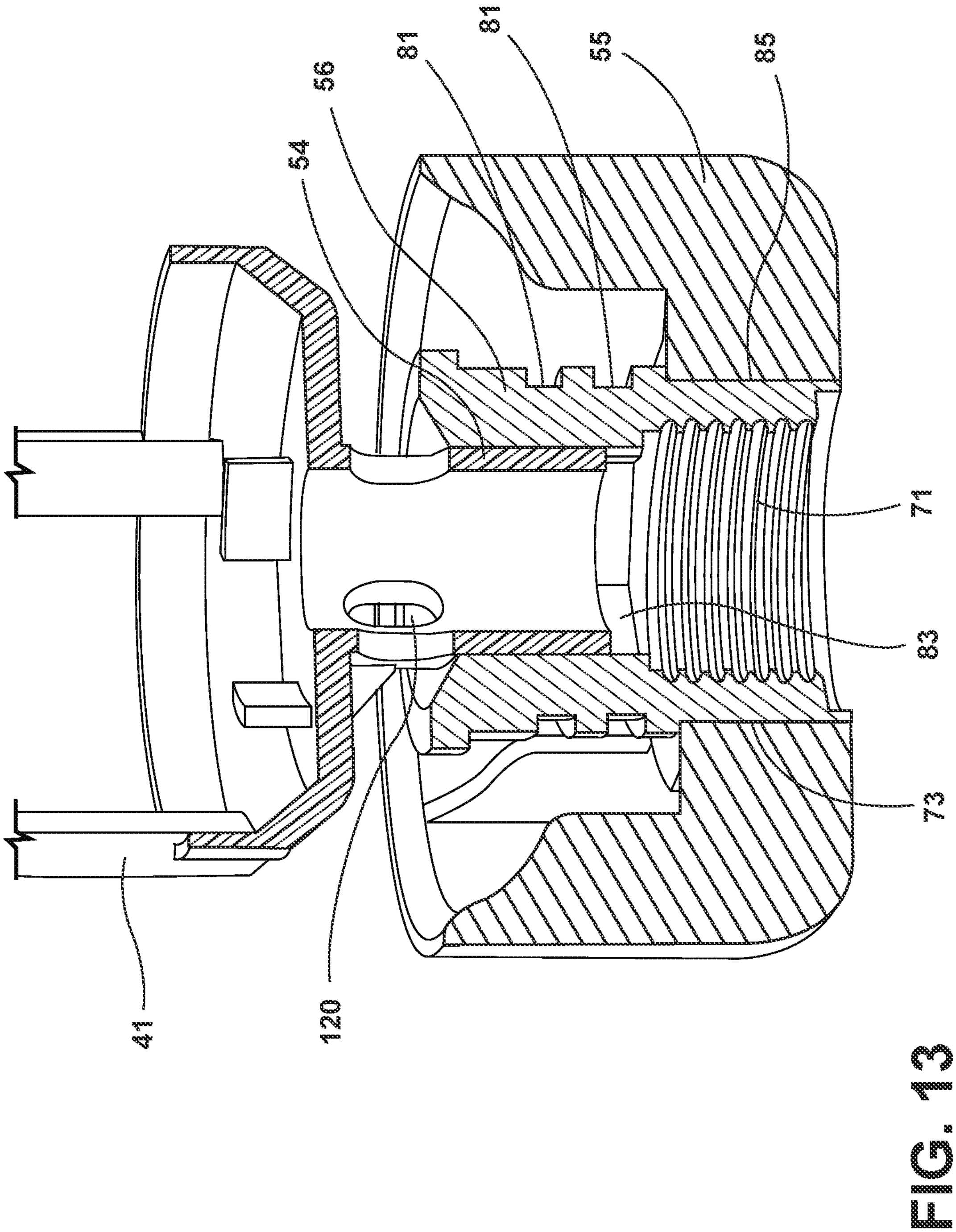
FIG. 13 is a partial front cross-sectional view of the screen member shown in FIG. 12.
Figure 14:
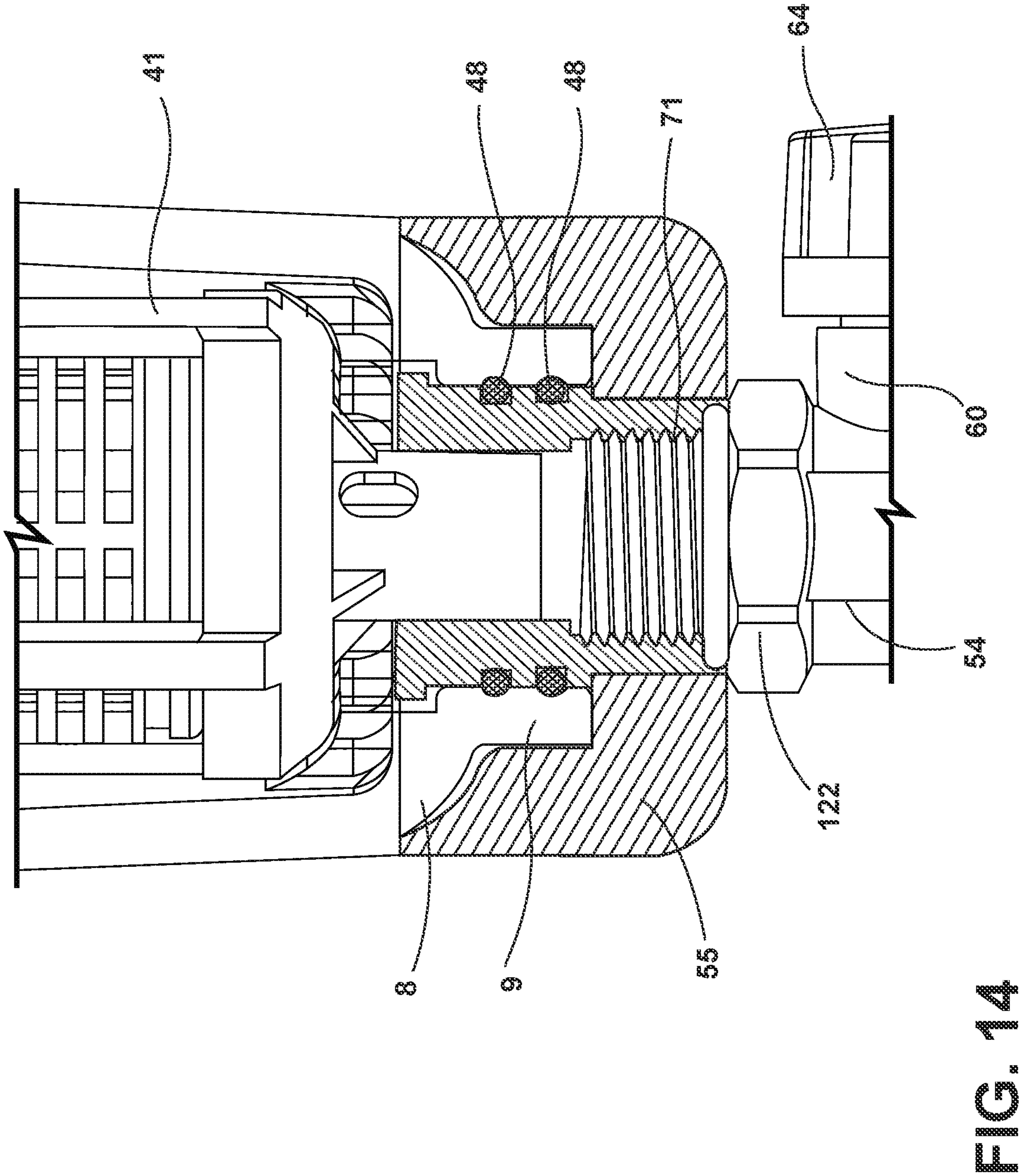
FIG. 14 is a partial front cross-sectional view of the screen member shown in FIG. 12 with the sealing member and second valve member.

An extension 45 extends from the body 41, as illustrated in FIG. 8. The extension 45 has lower opening 141 and openings 120 that are adjacent the body 41 of the screen member 40. The extension 45 of the screen member 40 couples to a drain port body 56, as illustrated in FIG. 11. Drain port body 56 includes an internal threaded section 71 and a surface 83 that generally matches the exterior surface of the extension 45 of the body 41 of screen member 40, as illustrated in FIG. 13. The drain port body 56 includes O-ring grooves 81 for receiving rubber O-rings 48, as illustrated in FIGS. 13 and 14. A drain port surround 55, illustrated in FIG. 9, includes a portion 73 that fits around exterior section 85 of the drain port body 56, as illustrated in FIG. 13. The drain port surround 55 can manually be rotated thereby also rotating the body 41 of screen member 40 while the screen 42 remains stationary. This rotational movement of the body 41 introduces turbulence which agitates and loosens collected debris so that it can enter opening 120 more easily and/or more easily be flushed from the lower section 8 through drain port 54.

A drain port 54 is coupled to the drain port body 56. The drain port 54 includes a second valve member 60 that includes a ball 62 that can be turned by handle 64. The ball 64 can include a stem section 67 that couples to handle 64 by fastener 69, as illustrated in FIG. 4. The drain port 54 can include a cap 66. The drain port 54 includes a threaded portion that is matingly received by the threaded portion 71 on the drain port body 56, as illustrated in FIG. 14. The drain port 54 can include a surface 122 with flats to assist in rotations of the drain port 54 into drain port body 56.

Figure 15:
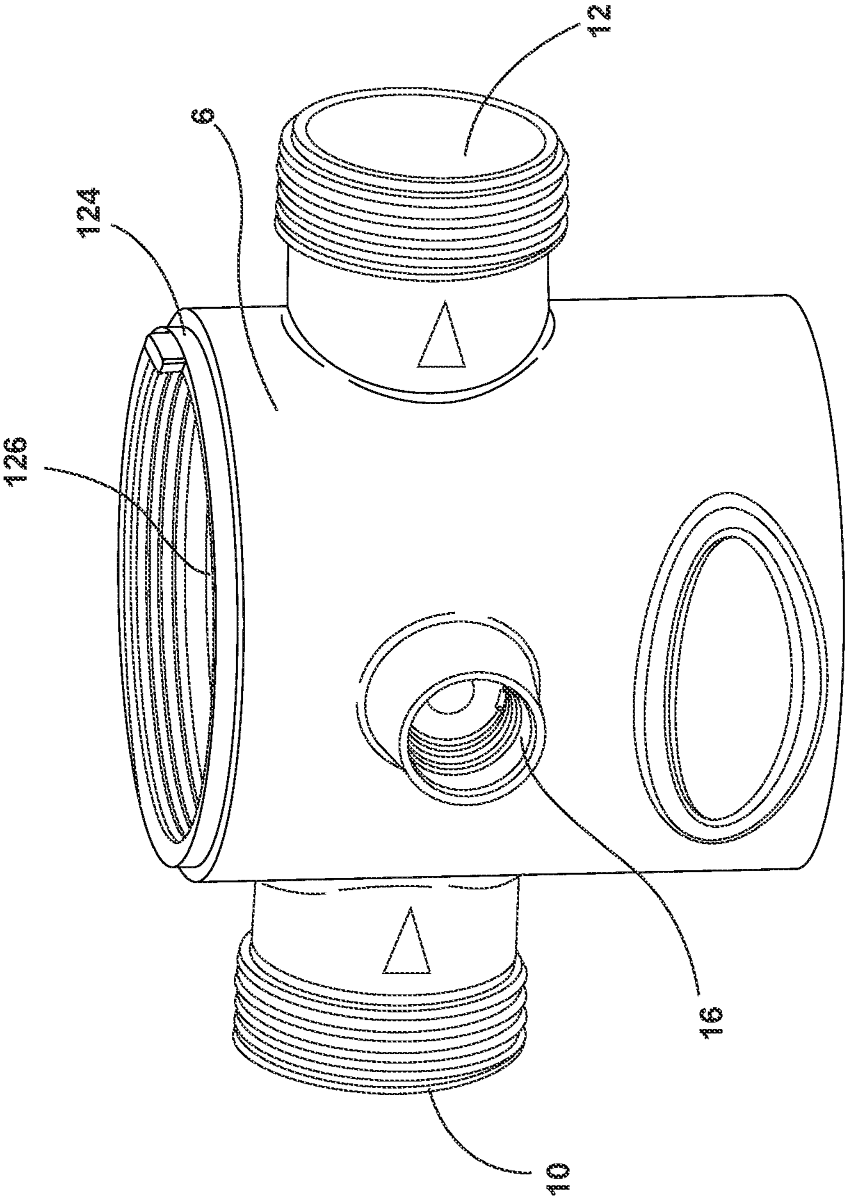
FIG. 15 is a front perspective view of the upper section of the water sediment filter assembly shown in FIG. 1.
Figure 16:
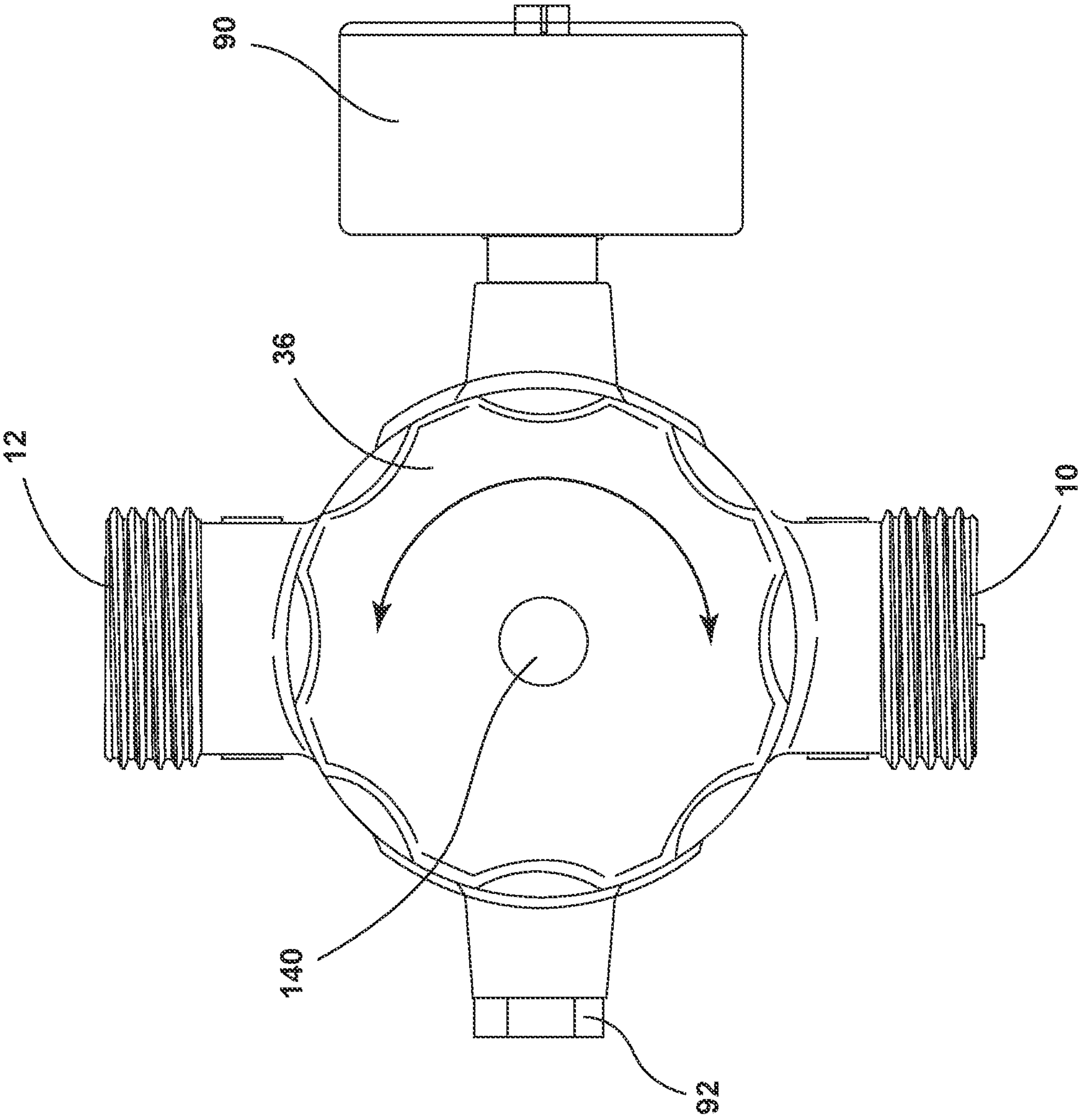
FIG. 16 is a top elevational view of the water sediment filter assembly shown in FIG. 1.
Figure 17:
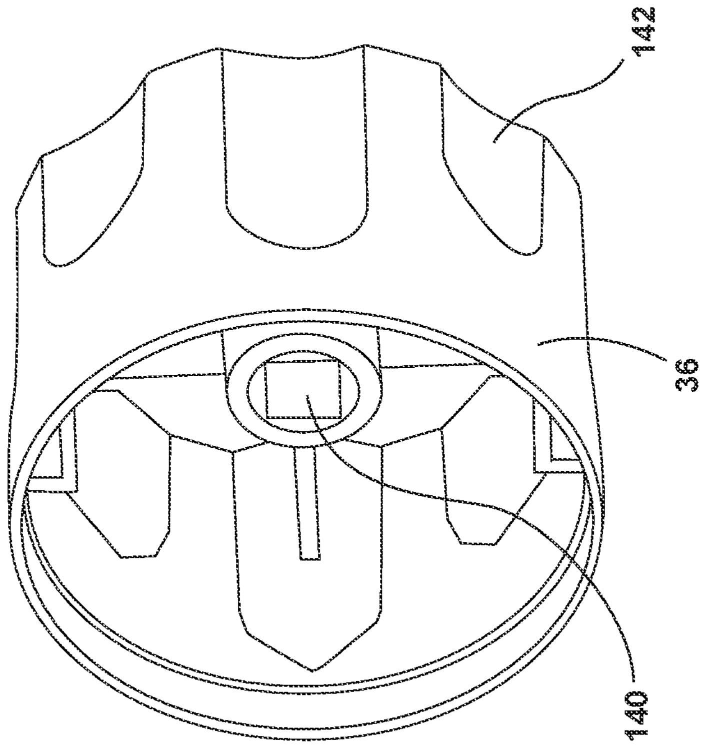
FIG. 17 is a bottom perspective view of the valve handle of the water sediment filter assembly shown in FIG. 1.
Figure 18:
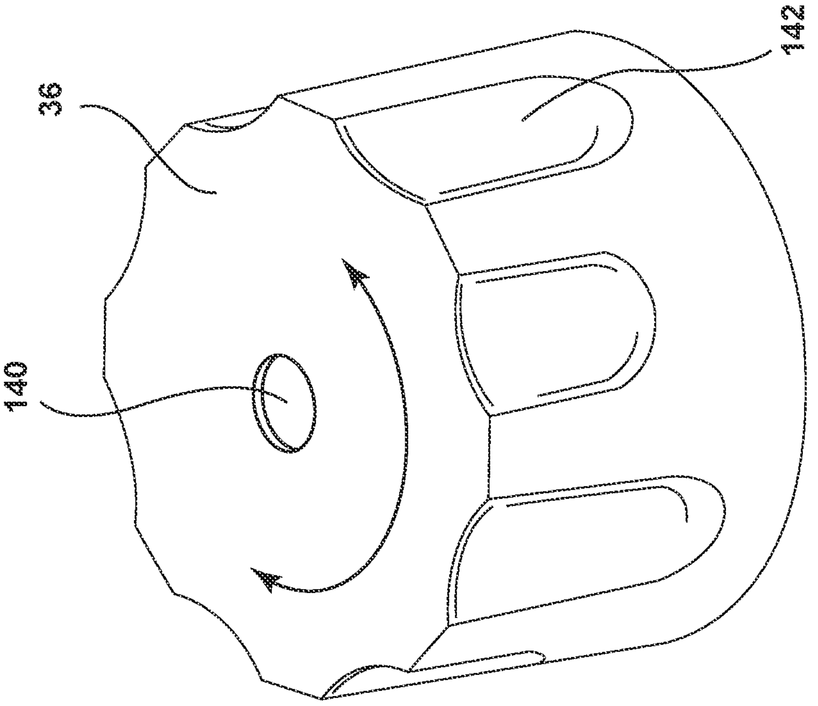
FIG. 18 is a top perspective view of the valve handle shown in FIG. 17.

The handle 36 is connected to the first valve member 20 via a fastener 37 to the stem portion 24 of the ball member 22, as illustrated in FIG. 4. In the illustrated embodiment, the handle 36 has a generally cylindrical configuration. The handle 36 can have an opening 140 and indents 142, as illustrated in FIGS. 17 and 18. The handle 36 may fit around the cylindrical upper surface 124 of the upper section 6, as shown in FIGS. 15 and 20. In the embodiment shown in FIG. 20, the handle 36 surrounds a separate member 36' that is coupled to the upper section 6. O-rings 164 within O-ring grooves 166 on stem portion 24 of the ball member 22 seal the stem portion 24 with respect to member 36'. Additional O-rings 162 can help seal the member 36' with respect to the upper section 6 of housing 4.

When the first valve member 20 is in a first position, as illustrated in FIG. 20, the water flows from the incoming piping system into the first port 10 and is deflected downward by flow diversion member 14 into the lower section 8 of the housing 4 of the water sediment filter assembly 2. The water flow is forced to pass through the screen 42 of screen member 40 to enter into the cavity 44 of screen member 40. The cavity 44 of screen member 40 is in fluid communication with the first opening 28 on the lower side L of the ball portion 26 of ball member 2 of the first valve member 20. Thus, the screened water enters the ball portion 26 through the cavity 44 of screen member 40. Then the screened water passes through the ball portion 26, through the second opening 30, to the second port 12 to enter into the connected plumbing system.

When the handle 36 is a second position, the second opening 30 of ball portion 26 will be positioned toward the flow diversion member 14, with the closed section of the ball portion 26 being positioned toward and preventing fluid flow into the second port 12. The second position permits the flushing of the water sediment filter assembly 2, as described below.

The drain port 54 includes a second valve member 60. The second valve member 60 can open and close the fluid passageway in the drain port 54. This permits the drain port 54 to be opened in order to drain or flush the water sediment filter assembly 2. Sediment that is screened by the screen 42 of screen member 40 will typically collect at the bottom of the lower section 8 of housing 4. The openings 120 in the extension 45 of screen member 40 permit the sediment to enter into the drain port 54 so that it can be flushed or purged from the water sediment filter assembly 2. For example, the first valve member 20 can be turned to the second position, turning off the flow from the water sediment filter assembly 2 to the outgoing plumbing system. This permits the opening of the second valve member 60 to flush the collected sediment out of the drain port 54.

A gauge 90 can be connected to either the third port 16 or fourth port 18, with the other port being plugged with plug 92. Alternatively, both the third port 16 and the fourth port 18 can be plugged by plug 92. In the illustrated embodiment, the gauge 90 is a pressure gauge. The third port 16 and fourth port 18 are also in fluid communication with the first opening 28 of the ball portion 26 of the ball member 22 of the first valve 20. Thus, the water supplied to the third port 16 and fourth port 18 has been screened by the screen member 40. Therefore, the water entering into gauge 90 will include reduced or eliminated sediment, thereby protecting the lifespan and functionality of the gauge 90.

Figure 21:
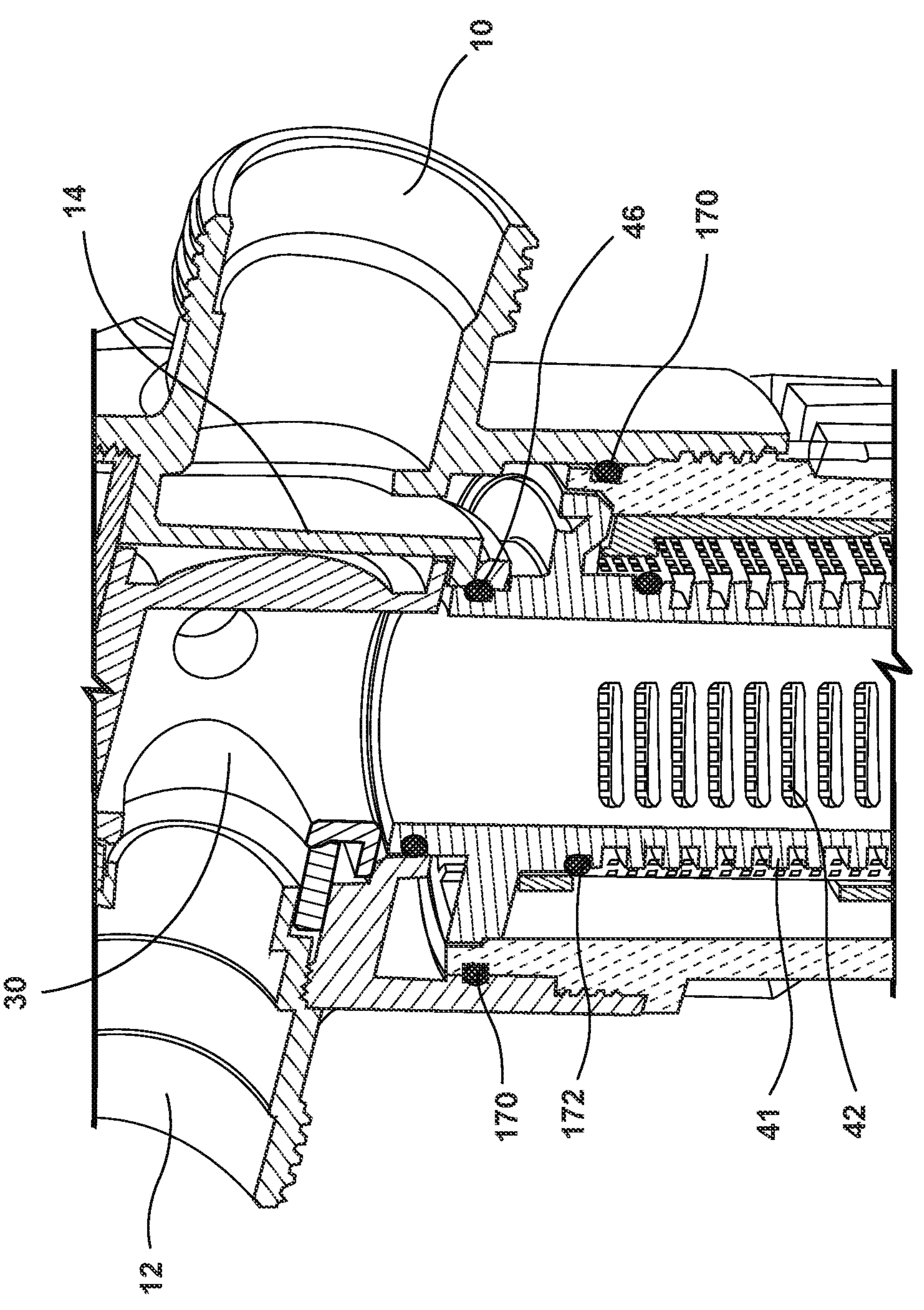
FIG. 21 is a partial cross-sectional view of the water sediment filter assembly of FIG. 1.

The screen member 40 is sealed with respect to the bottom and top portions of the lower section 8 to prevent unscreened water from entering into the upper section 6 from the lower section 8. This can include the use of seals 46 in grooves 152 at the upper end 150 of the screen member 40, as shown in FIGS. 4, 20, and 21. Additional seals 170, 172 may be used to help seal the lower section 8 and/or the screen member 40.

Figure 22:
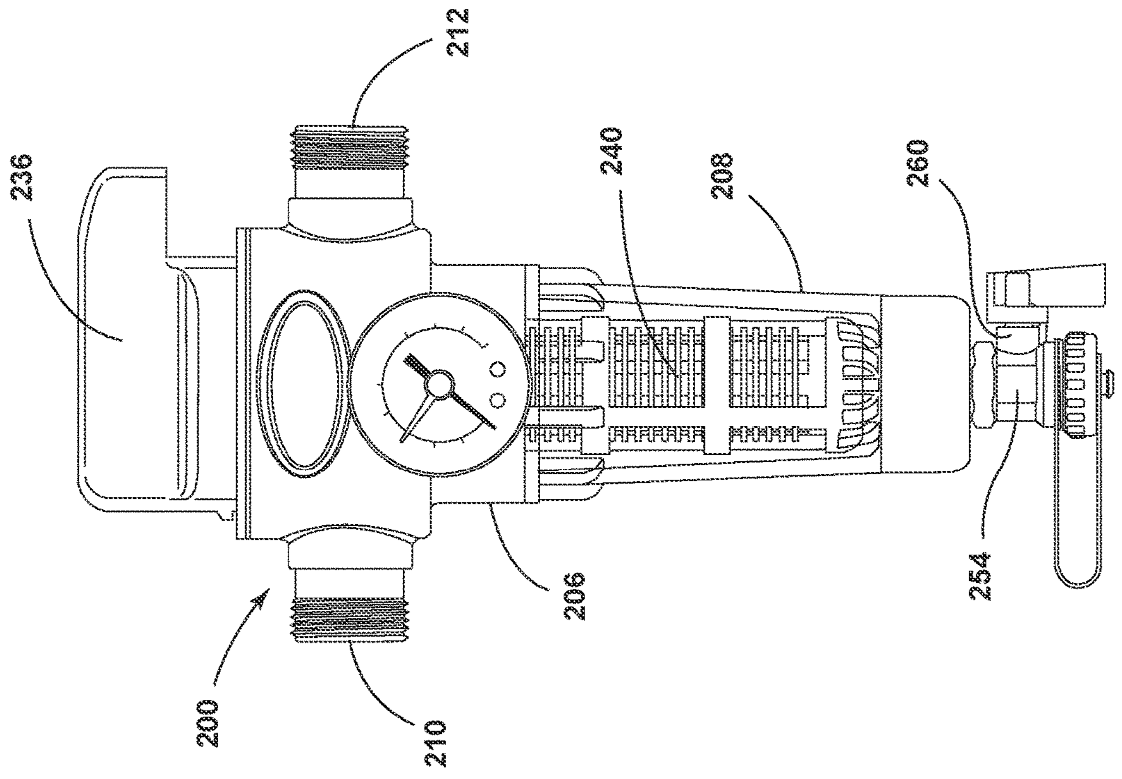
FIG. 22 is a front elevational view of another embodiment of a water sediment filter assembly according to one aspect of the present invention.
Figure 23:
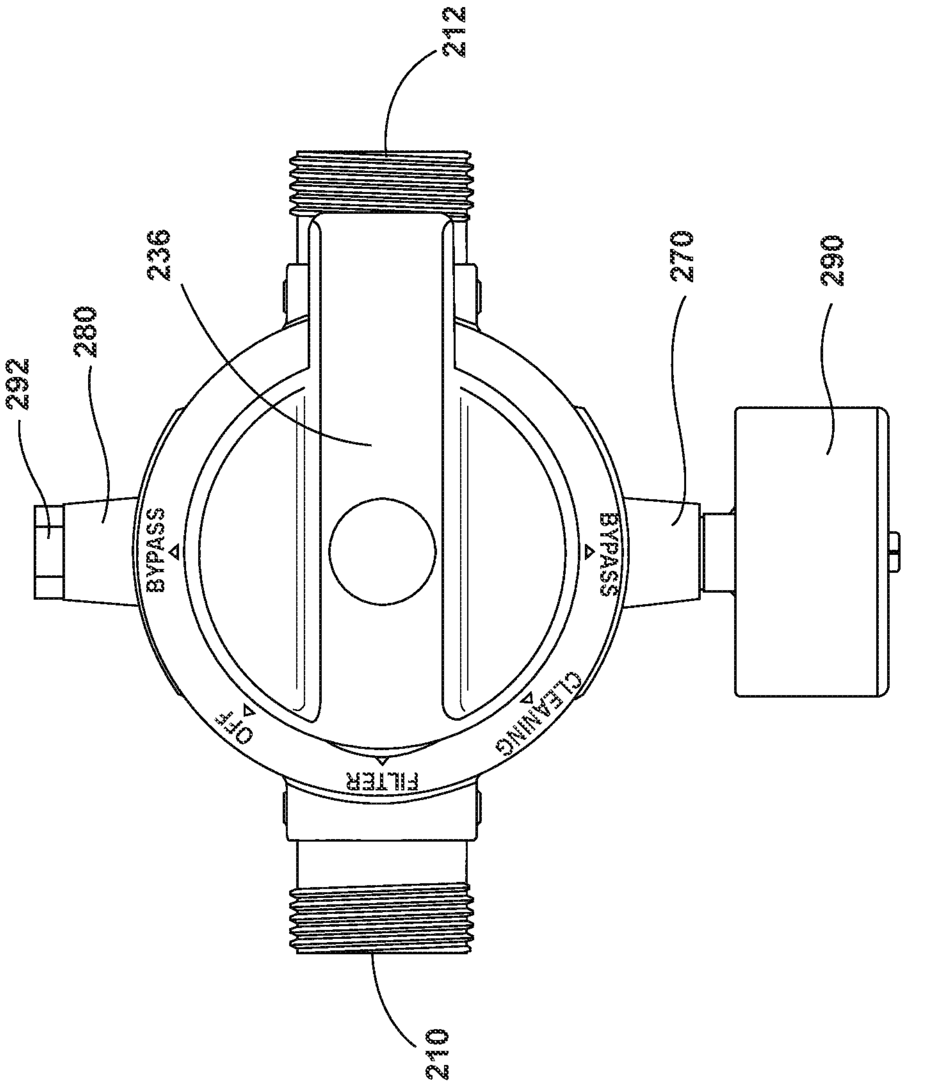
FIG. 23 is a top elevational view of the water sediment filter assembly shown in FIG. 22.

A second embodiment of a water sediment filter assembly 200 is illustrated in FIG. 22. The water sediment filter assembly 200 includes a first port 210 connected to the incoming water supply and a second port 212 connected to the outgoing water supply. The water sediment filter assembly 200 includes an upper section 206 and a lower section 208 that is removably coupled to the upper section 206. The water sediment filter assembly 200 includes a first valve member 220 that is located in between the first port 210 and second port 212 on upper section 206 of the water sediment filter assembly 200.

Figure 26:
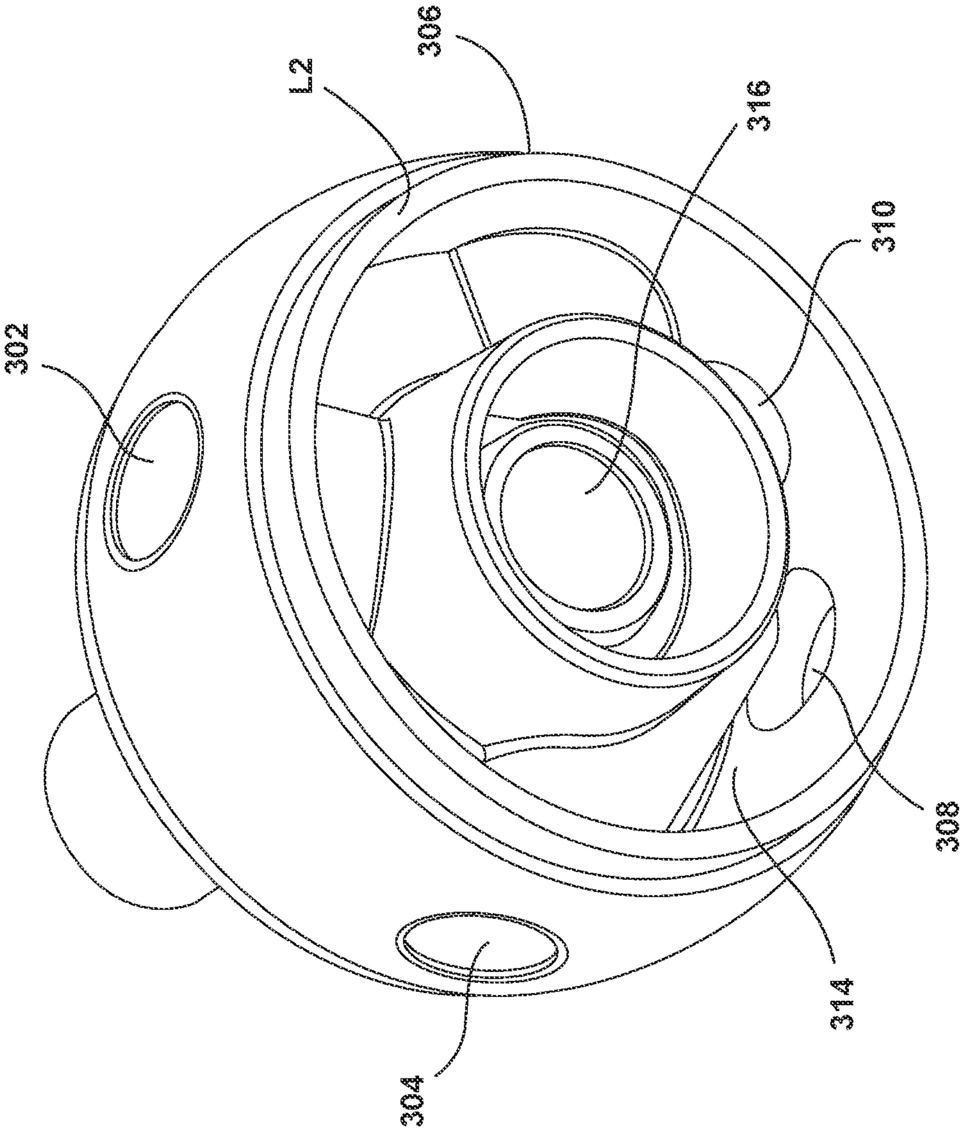
FIG. 26 is a bottom perspective view of the ball member of the first valve member shown in FIG. 25.
Figure 27:
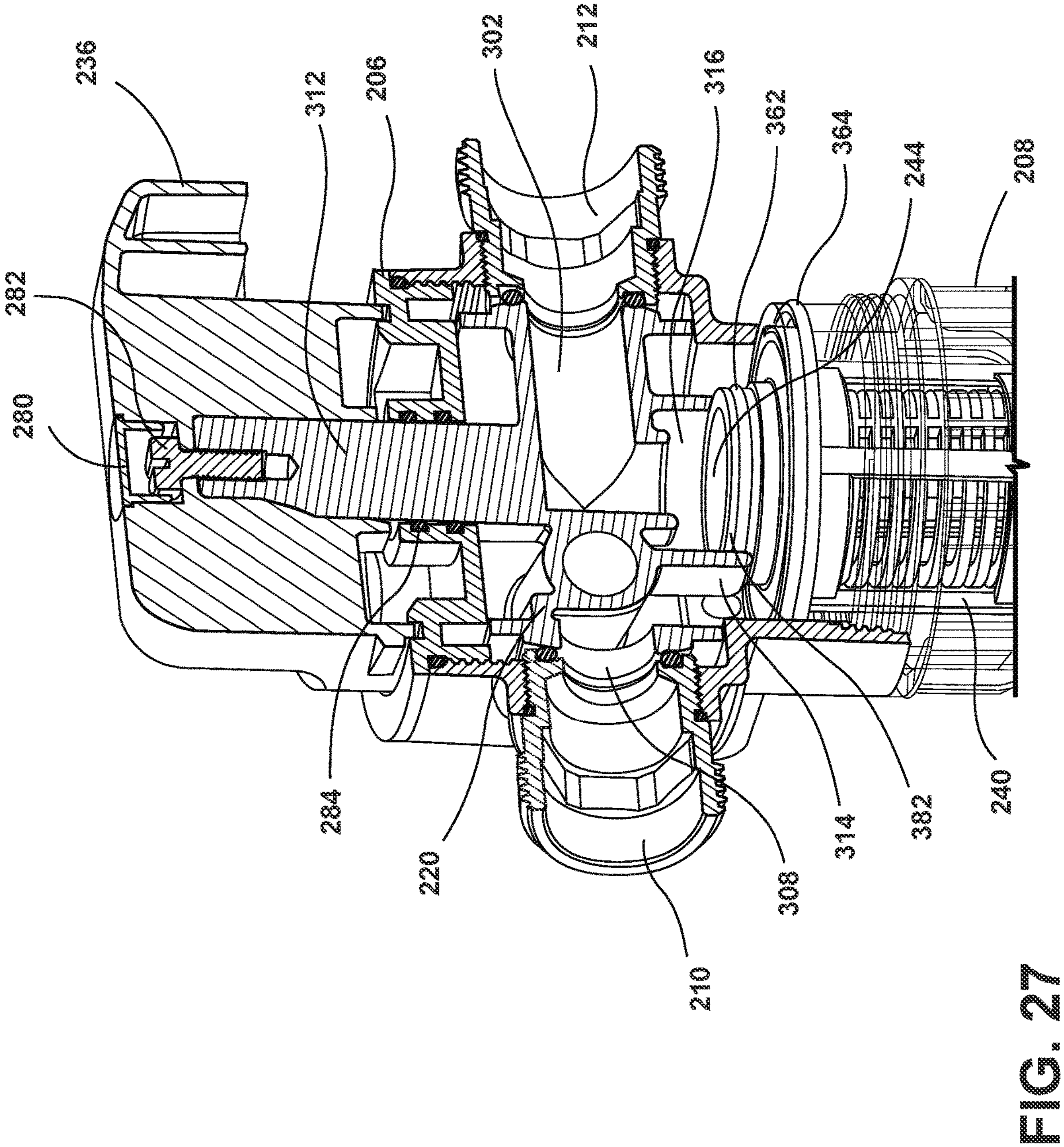
FIG. 27 is a partial front cross-sectional view of the water sediment filter assembly shown in FIG. 22.

The first valve member 220 includes a ball member 300 that has a stem section 312 and a central section C. The central section C includes a first central opening 308, a second central opening 310 located adjacent to the first opening 308, and a third central opening 302 located generally opposite the first central opening 308. A fourth central opening 304 and fifth central opening 306 are connected by a fluid passage B that can include an angled portion A. The lower section L2 includes a first lower opening 314 and a second lower opening 316. The first lower opening 314 is in fluid communication with the first central opening 308 and the second central opening 310 of the central section C of the ball member 300, as shown in FIG. 26. The second lower opening 316 is in fluid communication with the third central opening 302.

Figure 24:
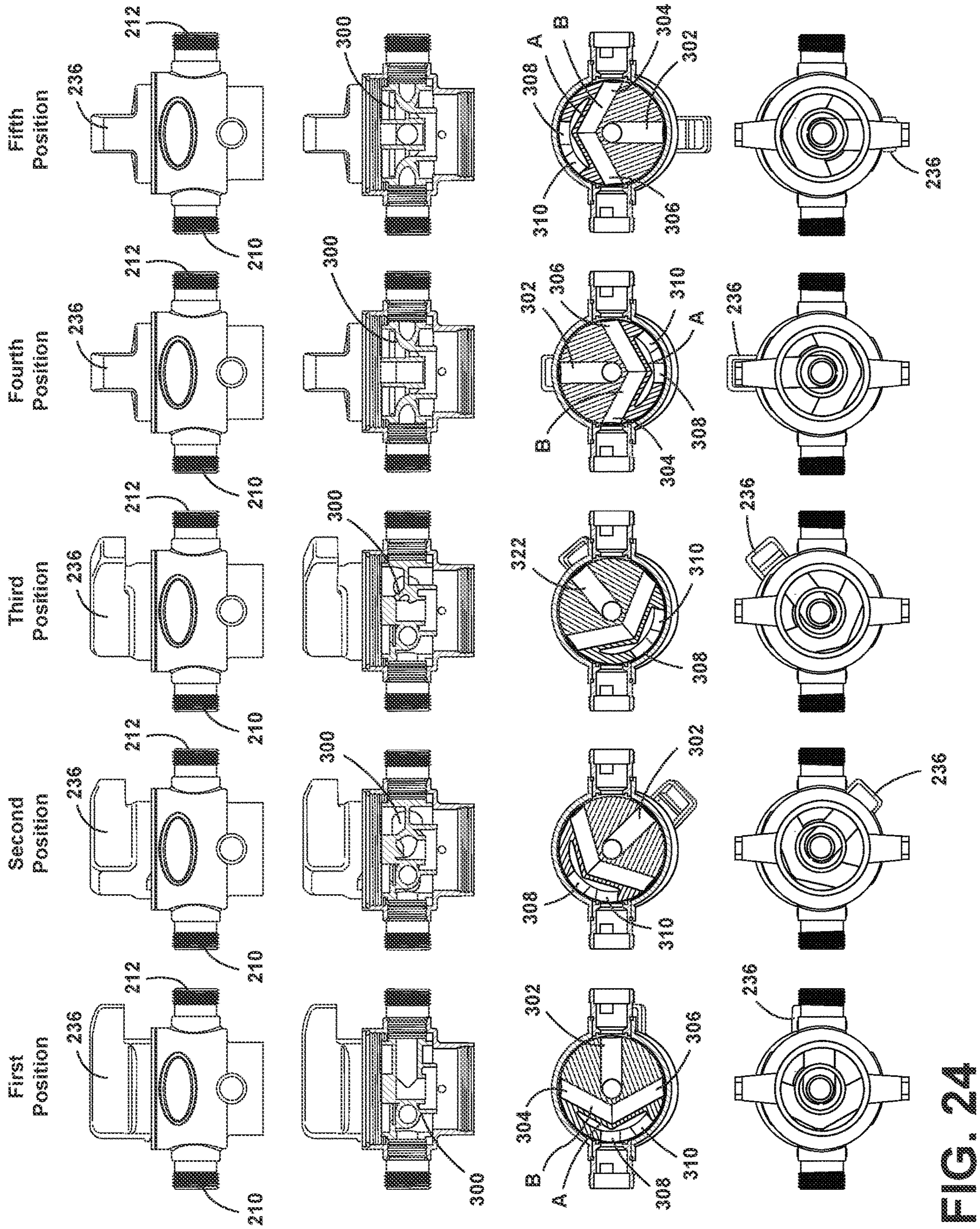
FIG. 24 illustrates the five different positions of the first valve member of the water sediment filter assembly shown in FIG. 22.
Figure 25:
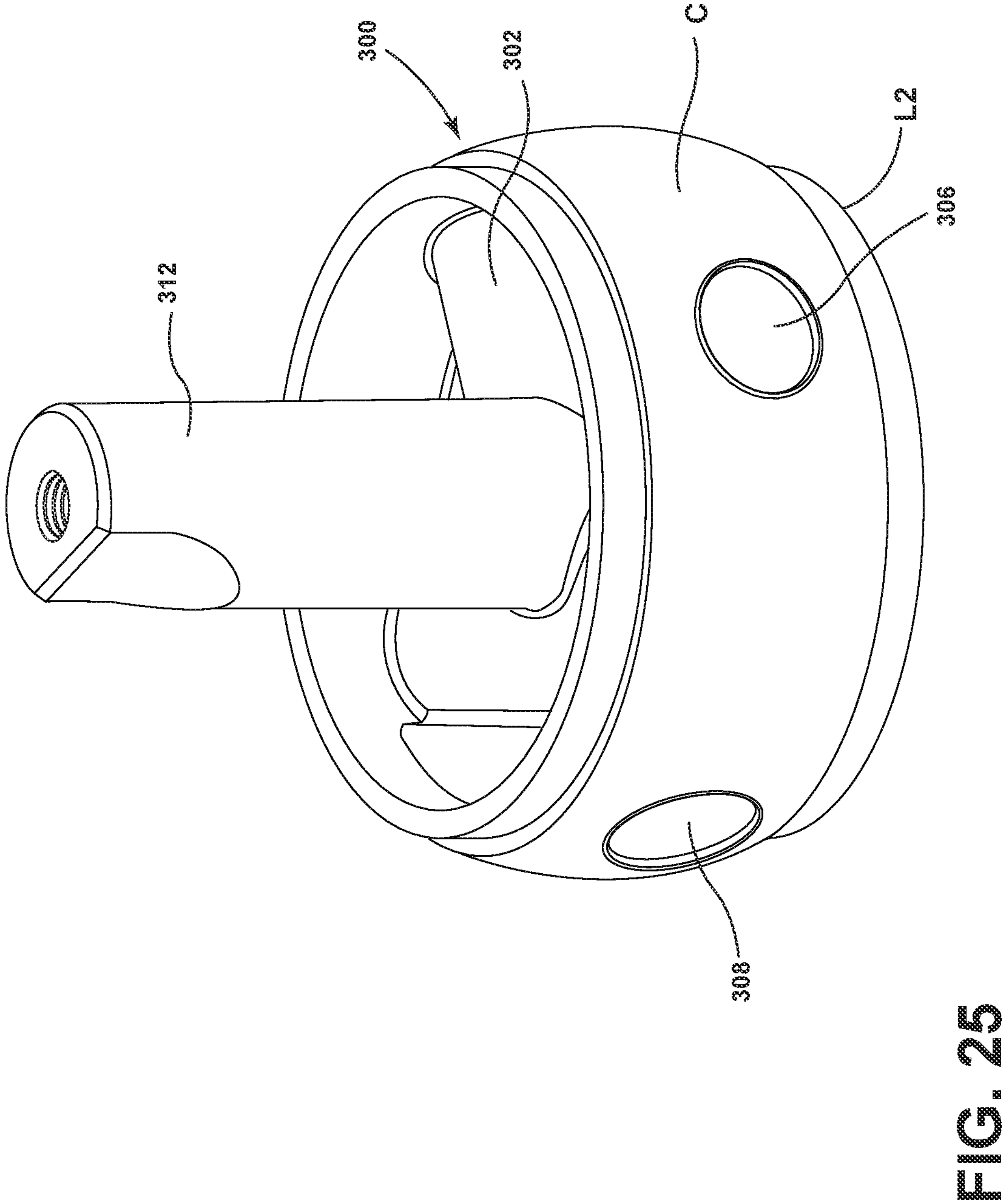
FIG. 25 is a front perspective view of the ball member of the first valve member of the water sediment filter assembly shown in FIG. 22.

A handle 236 is coupled to the stem portion 312 of the ball member 300 to permit the ball member 300 of first valve member 220 to be moved into five different positions. In the first position, the first central opening 308 is aligned with the first port 210 thereby permitting incoming water flow to enter into the first central opening 308 down through the first lower opening 314 into the lower section 208 so that the water can be filtered by screen member 240. The cavity 244 of screen member 240 is in fluid communication with the second lower opening 316 on ball member 300. The second lower opening 316 permits screened water to enter into the ball member 300 and the third central opening 302. Thus, when the first valve member 320 is in a first position, as illustrated in FIG. 24, the first central opening 308 is in fluid communication with the first lower opening 314, permitting incoming water flow through first port 210 to enter into the lower section 208 and be screened by screen member 240. The screened water then enters into the second lower opening 316 and exits the third central opening 302 to the second port 212 and to the outgoing water supply.

When the first valve member 220 is in a second position, the second central opening 310 is in fluid communication with the first port 210, permitting flow of the water into the first lower opening 314. However, the filtered water entering the second lower opening 316 cannot exit the first valve member 220 as the third central opening 302 is not aligned with the second port 212, as illustrated by the second position in FIG. 24. This position allows for the cleaning of the water sediment filter assembly 200 as the second valve member 260 on the drain port 254 can be opened to clean out any of the collected sediment that has been screened by screen member 240. The incoming water from the first port 210 can create pressure to clean out the collected sediment pushing it through drain port 254.

When the first valve member 220 is in a third position, no central port is aligned with the first port 210 or second port 212. This creates a closed or off position for the water sediment filter assembly 200 as water will not enter into or pass from the water sediment filter assembly 200.

When the first valve member 220 is in a fourth position, the fourth central opening 304 is aligned with the first port 210 and the fifth central opening 306 is aligned with the second port 212 creating a first bypass position. Because the fourth central opening 304 and the fifth central opening 306 are not in fluid communication with either the first lower opening 314 or the second lower opening 316, the water entering the first port 210 passes through the bypass passageway B including past the angled section A to the second port 212 thereby bypassing the screening function of the screen member 240.

Similarly, when the first valve member 220 is in a fifth position, the fifth central opening 306 is aligned with the first port 210 and the fourth central opening 304 is aligned with the second port 212 creating a second bypass position. Again, the fluid entering from the first port 210 to the fifth central opening 306 will move directly through the bypass passageway B to the fourth central opening 304 and out the second port 212.

Notably, when the first valve member 220 is in the third, fourth, or fifth positions, the lower section 208 can be removed from the upper section 206 in order to replace or service screen member 240 without needing to shut off the water supply to the water filter assembly 200. The bypass positions permit the removal of the lower section 208 without the water supply being interrupted.

The ball members 22, 300 can be an integral piece as illustrated in the Figures or could include multiple pieces. The ball members 22, 300 can be made from any high strength material. In the illustrated embodiments, the ball members 22, 300 are made from a lead-free dezincification-resistant (DZR) alloy, such as C46500 brass, which can be chrome plated. Alternatively, the ball members 22, 300 could be made from another metal material, such as stainless steel or a high strength polymer material.

Another embodiment of a water sediment filter assembly 400 is shown in FIGS. 28-36. The water sediment filter assembly 400 includes a housing 404 which has an upper section 406 and a lower section 408. The lower section 408 is removably coupled to the upper section 406.

Figure 29:
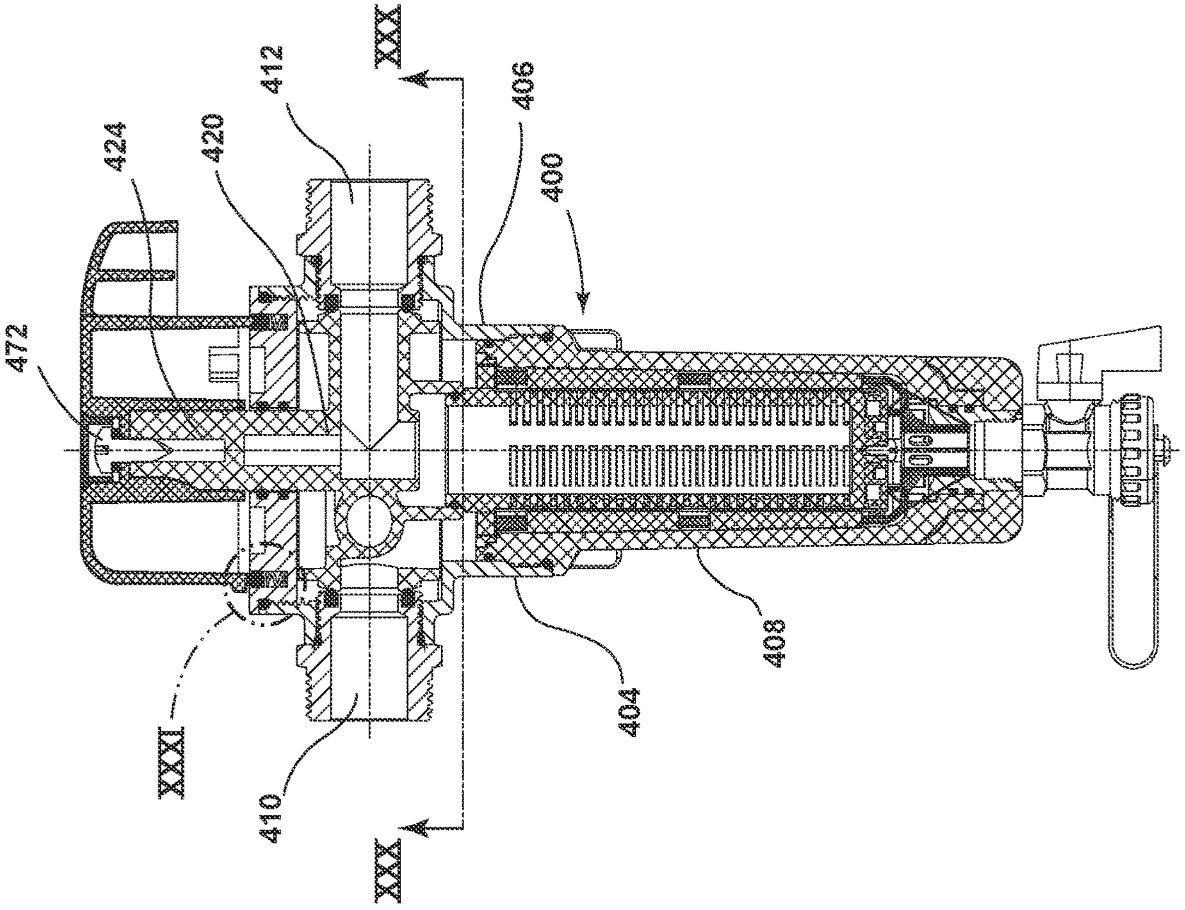
FIG. 29 is a partial side cross-sectional view of the water sediment filter assembly shown in FIG. 28.
Figure 30:
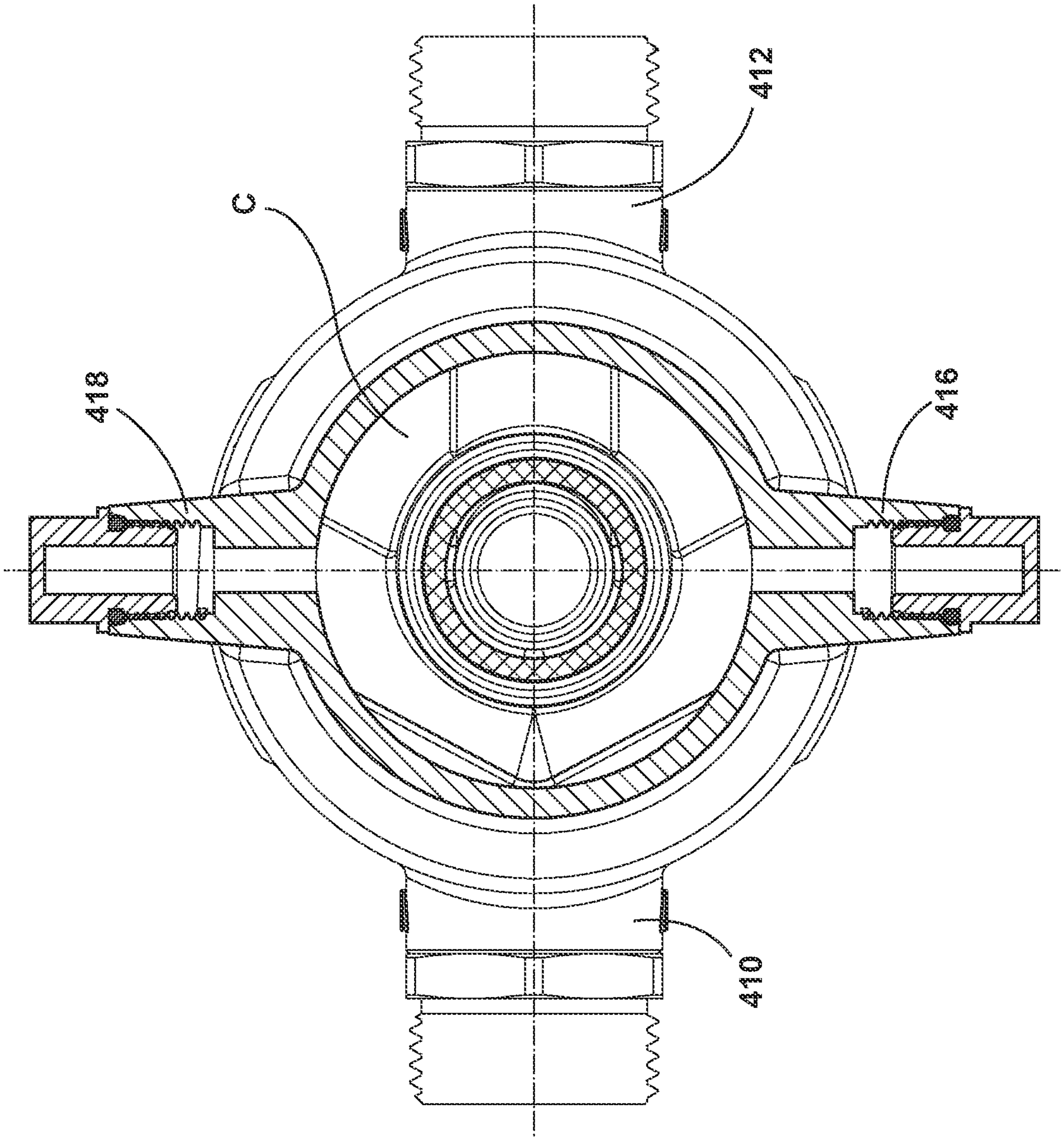
FIG. 30 is a partial top cross-sectional view of the water sediment filter assembly shown in FIG. 28 taken along line XXX-XXX.
Figure 31:
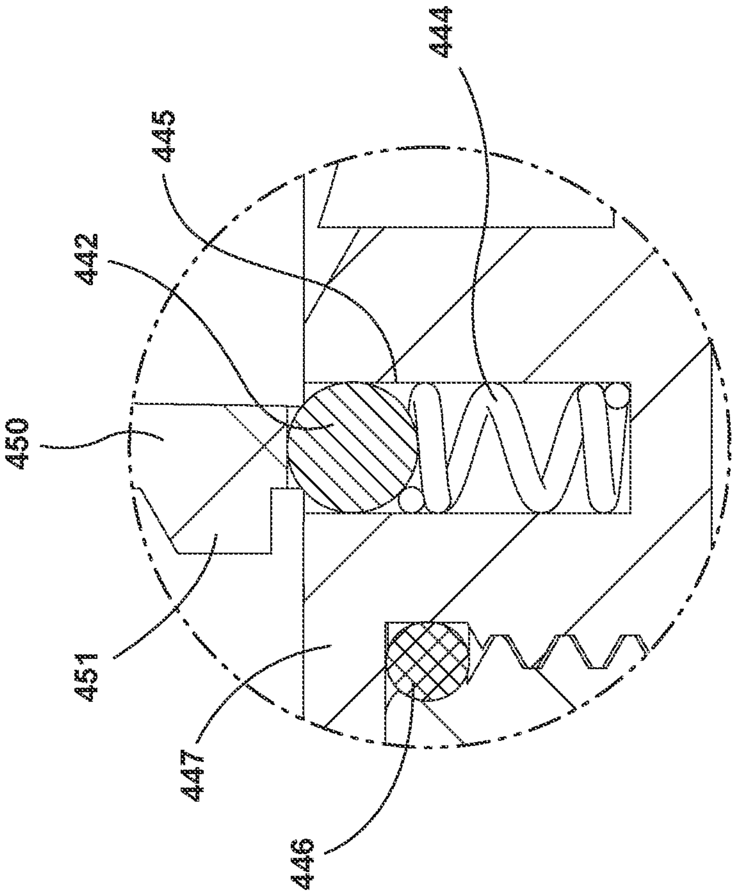
FIG. 31 is an enlarged cross-sectional view of area XXXI from FIG. 28.
Figure 32:
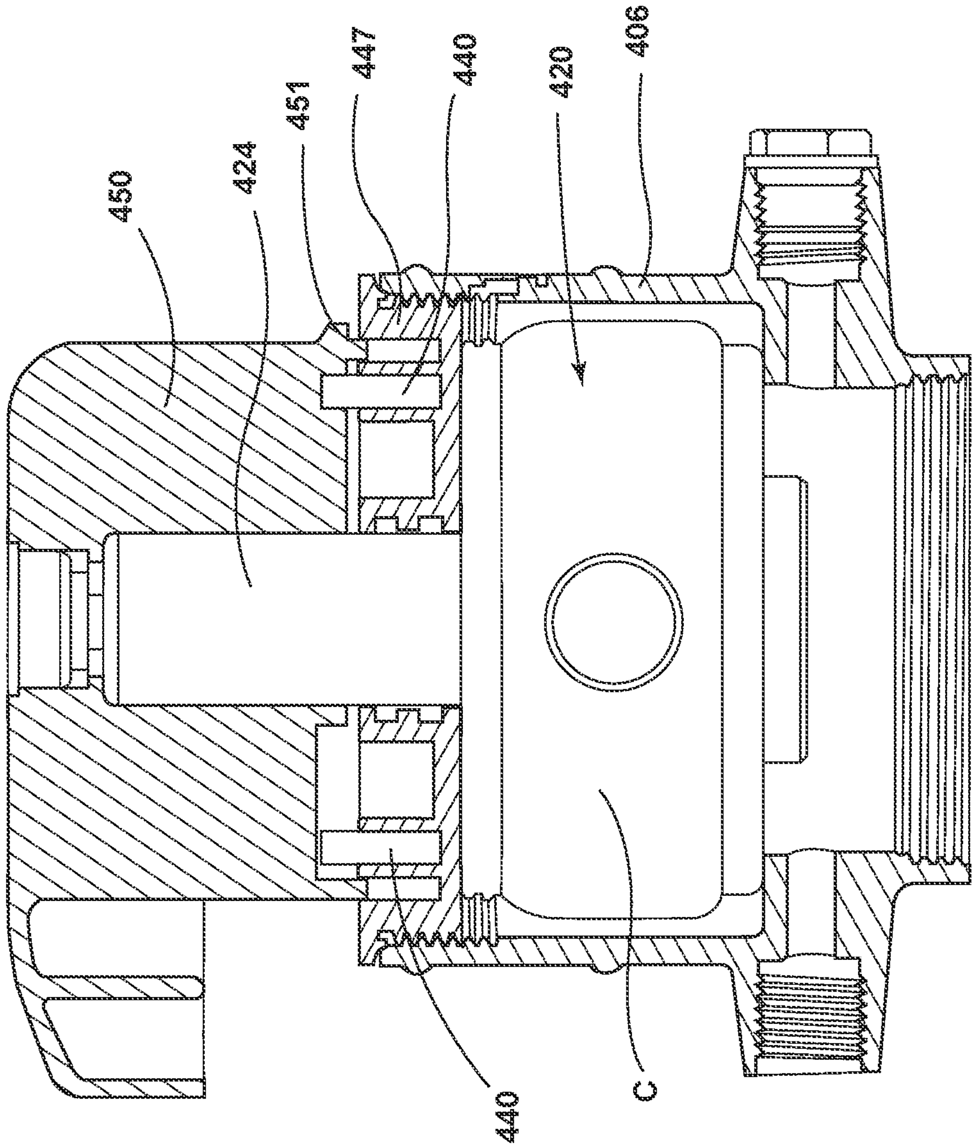
FIG. 32 is a partial cross-sectional view of the top section of the water sediment filter assembly shown in FIG. 28.
Figure 33:
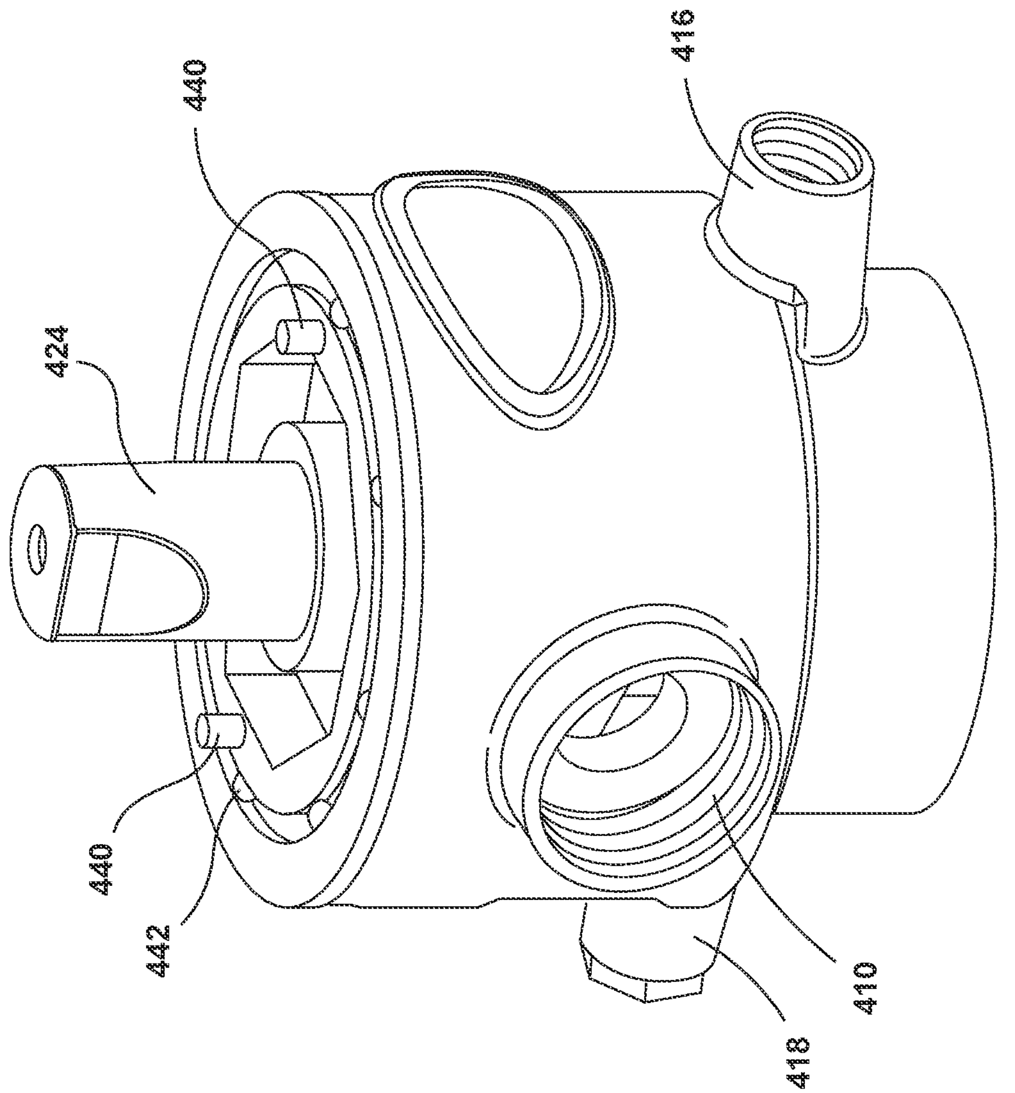
FIG. 33 is a front perspective view of the top section of the water sediment filter assembly shown in FIG. 28 without the handle.

The upper section 406 includes a first port 410 and a second port 412. In the illustrated embodiment, the second port 412 is positioned generally opposite the first port 410. The first port 410 receives a supply of incoming water, and the second port 412 is coupled to the outgoing piping/tubing that is connected to the water sediment filter assembly 2. As shown in FIG. 29, the upper section 406 also includes a third port 416 and a fourth port 418. In the illustrated embodiment, the third port 416 and fourth port 418 are disposed generally opposite each other.

A first valve member 420 is positioned within the upper section 406. The first valve member 420 has a stem portion 424 and a central section C similar to the valve member 220 described above. The water sediment filter assembly 400 has a handle 450 that engages spring loaded balls 442. Each ball 442 is positioned over a spring 444 in an opening 445 in the valve cap 447. The valve cap 447 is coupled to the upper section 406. The coupling can include s sealing member 446 such as an O-ring.

Figure 28:
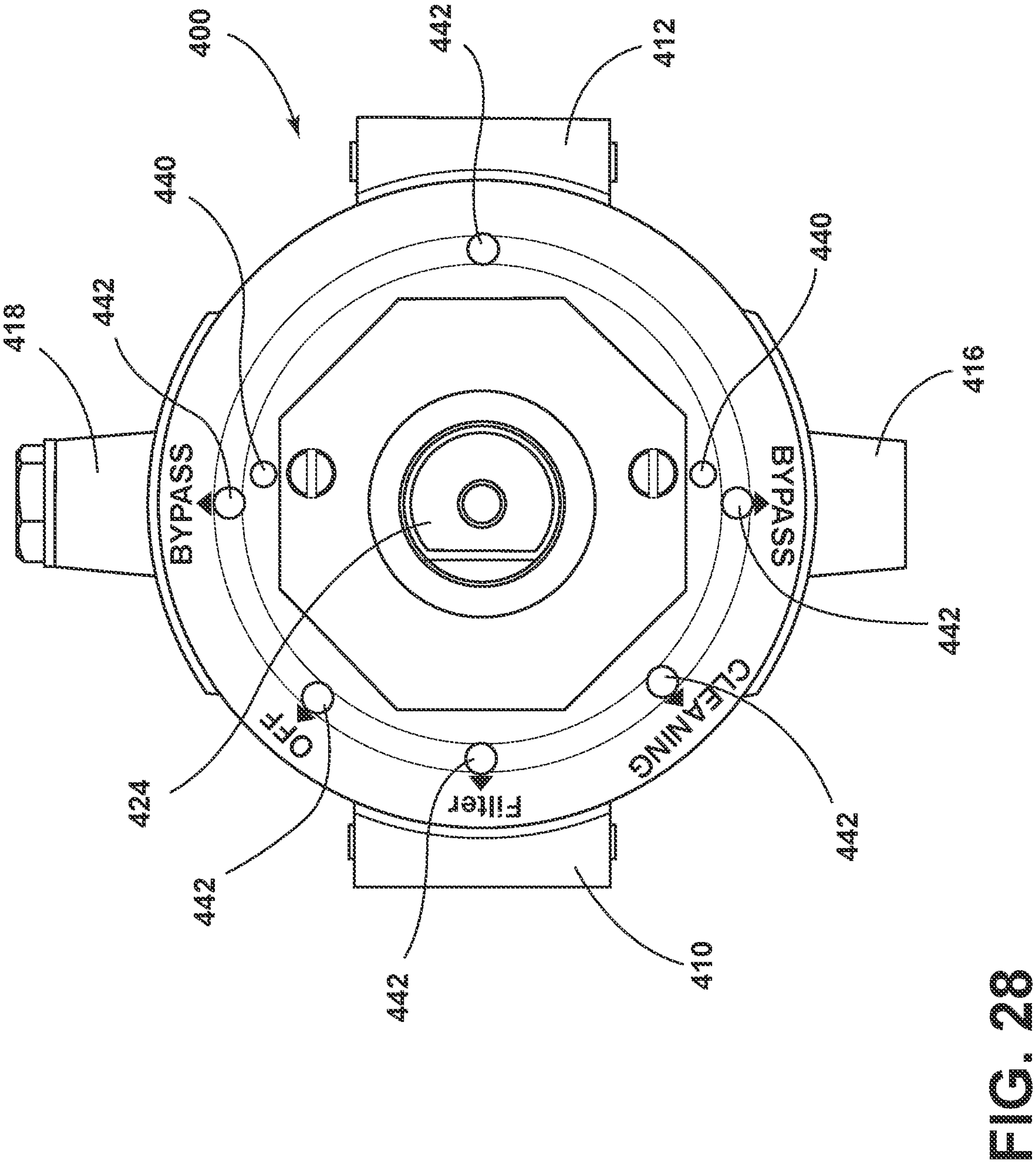
FIG. 28 is a top view of another embodiment of a water sediment filter assembly.
Figure 34:
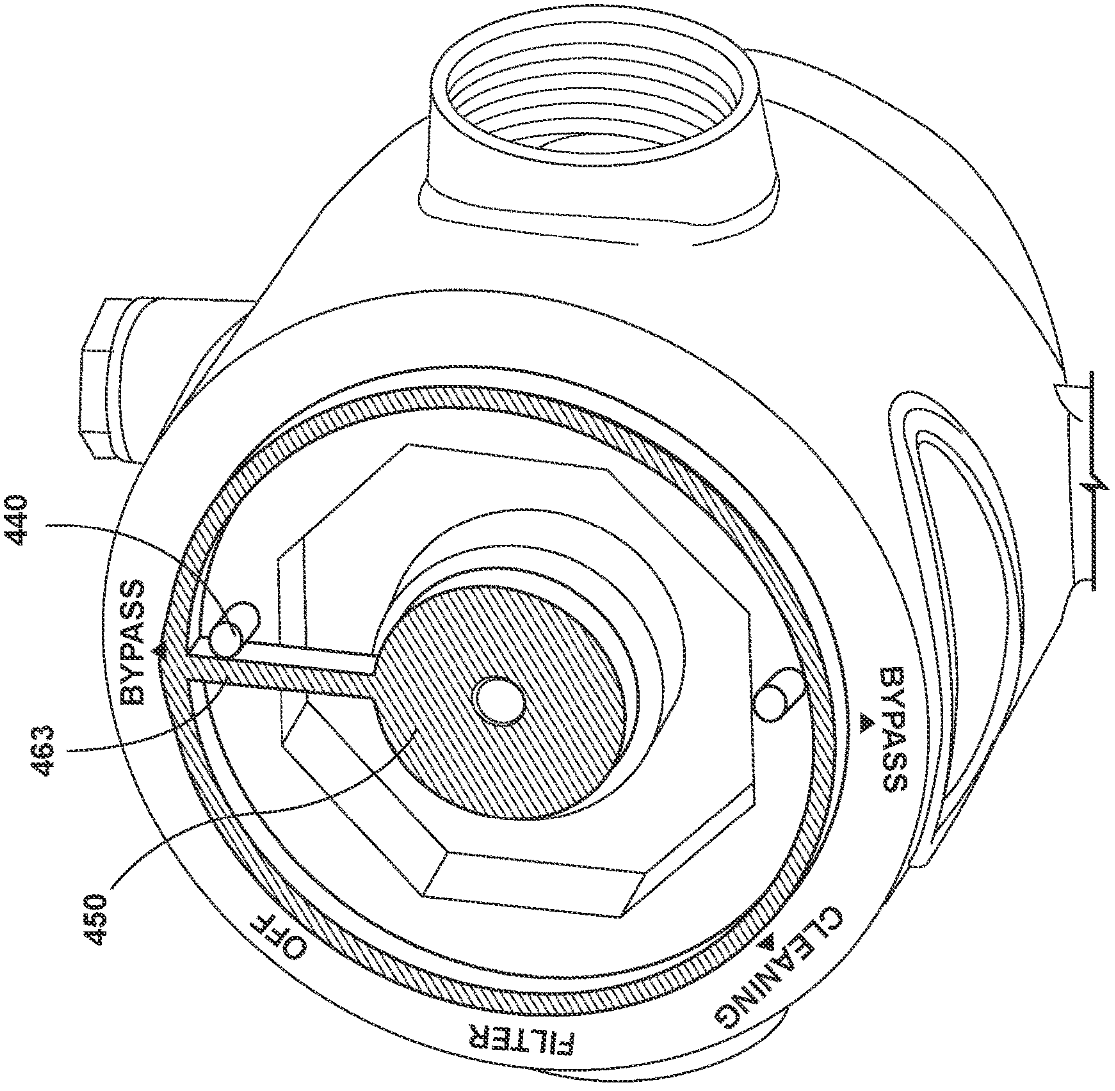
FIG. 34 is a partial top cross-sectional view of the top section shown in FIG. 32.
Figure 35:
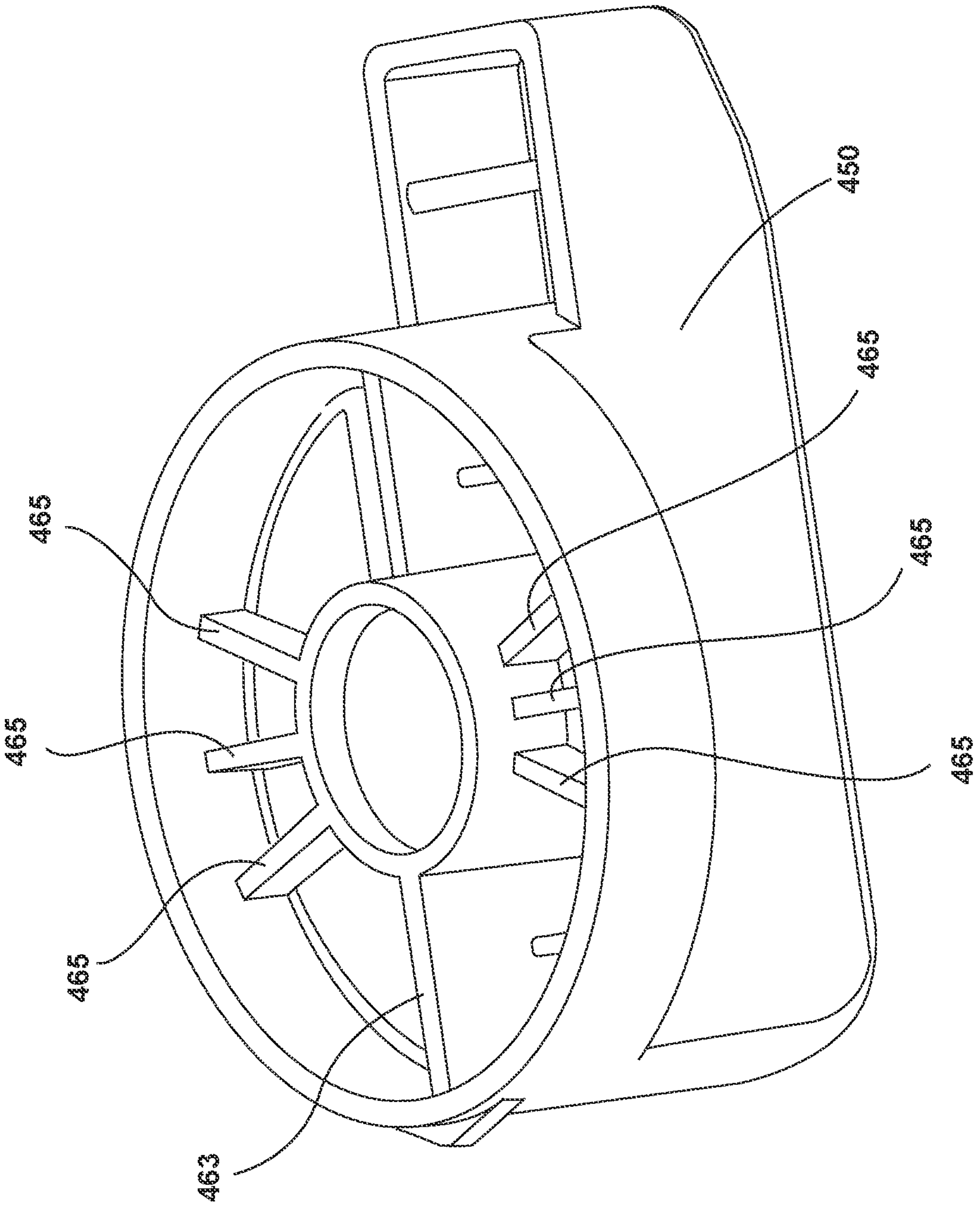
FIG. 35 is a bottom perspective view of the handle of the water sediment filter assembly shown in FIG. 28.
Figure 36:
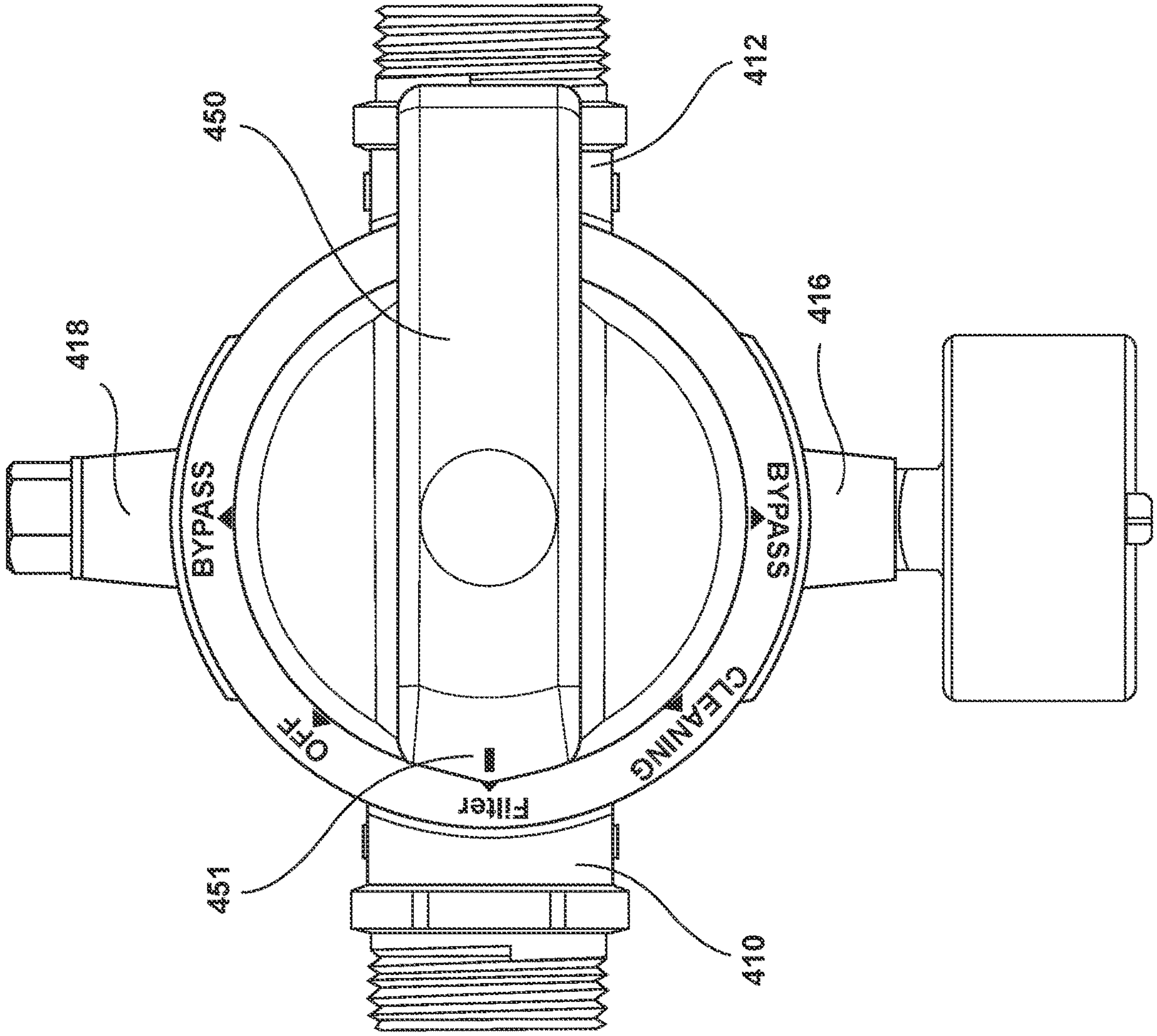
FIG. 36 is a top view of the water sediment filter assembly shown in FIG. 28 with the handle.

A handle 450 is coupled via a fastener 472 to the stem 424 of the first valve member 420 to permit rotation of the first valve member 420 to five settings: BYPASS; OFF; FILTER; CLEANING; and BYPASS as illustrated in FIGS. 28, 34, and 36. The handle 450 has a point 451 which shows the alignment of the handle 450 with respect to the settings. The spring loaded balls 442 are located adjacent to each position of the water sediment filter assembly 400 to provide the user with a “resistance feel” when rotating the handle 450 to each setting so as to affirm proper alignment. Locating pins 440 are located 180 degrees apart on both BYPASS setting positions. The locating pins 440 will act as stops for the handle 450 rotation thereby keeping the range of motion restricted to the outflow direction and preventing the handle 450 from being rotated a complete 360 degrees in the inlet direction which could cause the openings in the central section C of the first valve member 420 to not align with the desired ports 410, 412, 416 and 418 for the associated settings. A locating section 463 on the handle 450 is the portion of the handle 450 that can contact the locating pins 440 as illustrated in FIG. 34. The handle 450 can include additional section 465 that would be positioned over the balls 442 when the handle is moved to a setting.

In the FILTER setting, the water sediment filter assembly 400 will permit water to enter port 410, be diverted to the filter and have the filtered water exit via port 412. In the BYPASS settings, the water coming from the port 410 is not filtered and exits port 412. In the OFF setting, the water does not enter the water sediment filter assembly 400 as the first valve member 420 blocks flow in from port 410. In the CLEANING setting, port 412 is blocked to that the second valve can be opened to allow the removal of debris through the drain port.

In the foregoing description, it will be readily appreciated by those skilled in the art that modifications may be made to the invention without departing from the concepts disclosed herein. Such modifications are to be considered as included in the following claims, unless these claims by their language expressly state otherwise.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. A water sediment filter assembly, comprising:

a housing having an upper section and a lower section, wherein:
- said upper section has a first port and an oppositely disposed second port;
- said upper section includes oppositely disposed third and fourth ports;
- said upper section includes an intersection point where the centerlines of the first port, the second port, the third port, and the fourth port intersect;
- said lower section includes an open cavity;
- said lower section is removably coupled to said upper section;
- said lower section having a drain port;

a valve cap coupled to said upper section, said valve cap including an opening in which a plurality of spring biased balls are positioned;

a pair of location pins positioned on said valve cap;

a first valve member located in said upper section with a central section positioned at said intersection point, wherein:
- said first valve member includes a stem portion;
- said central section having a first central opening, a second central opening located adjacent to said first central opening, a third central opening located generally opposite said first central opening, a fourth central opening, a fifth central opening, a first lower opening in fluid communication with said first central opening, and a second lower opening in fluid communication with said third central opening;

a screen member positioned in said cavity of said lower section, said screen member including a cavity section that is in fluid communication with said second lower opening;

a second valve member coupled to said drain port; and a handle coupled to said stem portion of said first valve member, said handle having a portion that can be rotated between said pair of location pins.

2. The water sediment filter assembly of claim 1, wherein said screen member includes a body portion that surrounds a screen portion.

3. The water sediment filter assembly of claim 1, including a pressure gauge coupled to said third or said fourth port.

4. The water sediment filter assembly of claim 3, including a plug coupled to the other of said third or fourth port.

5. The water sediment filter assembly of claim 1, wherein said drain port is a separate piece that is coupled to the bottom of said lower section.

6. The water sediment filter assembly of claim 2, wherein said body portion includes an extension section having a plurality of openings.

7. The water sediment filter assembly of claim 2, wherein said body portion can be rotated with respect to said screen portion.

8. The water sediment filter assembly of claim 1, wherein when said first valve member is in a first position, said first central opening is aligned with said first port and said third central opening is aligned with said second port, permitting water to enter said first port and exit said second port after having passed through said screen member.

9. The water sediment filter assembly of claim 1, wherein when said first valve member is in a second position, said second central opening is in fluid communication with said first port, permitting flow of water into the first lower opening, and said third central opening is not aligned with said second port.

10. The water sediment filter assembly of claim 1, wherein when said first valve member is in a third position, no central port is aligned with said first port or said second port.

11. The water sediment filter assembly of claim 1, wherein when said first valve member is in a fourth position, said fourth central opening is aligned with the first port and said fifth central opening is aligned with said second port.

12. The water sediment filter assembly of claim 1, wherein when said first valve member is in a fifth position, said fifth central opening is aligned with said first port and said fourth central opening is aligned with said second port.

13. A water sediment filter assembly, comprising:
- a housing having an upper section and a lower section, wherein:
  - said upper section has a first port and an oppositely disposed second port;
  - said lower section includes an open cavity;
  - said lower section is removably coupled to said upper section;
  - said lower section having a drain port;
- a valve cap coupled to said upper section, said valve cap including an opening in which a plurality of spring biased balls are positioned;
- a pair of location pins positioned on said valve cap;
- a first valve member located in said upper section with a central section positioned at an intersection point, wherein:
  - said first valve member includes a stem portion;
  - said central section having a first central opening, a second central opening located adjacent to said first central opening, a third central opening located generally opposite said first central opening, a fourth central opening, a fifth central opening, a first lower opening in fluid communication with said first central opening, and a second lower opening in fluid communication with said third central opening;
- a screen member positioned in said cavity of said lower section, said screen member including a cavity section that is in fluid communication with said second lower opening;
- a second valve member coupled to said drain port; and
- a handle coupled to said stem portion of said first valve member, said handle having a portion that can be rotated between said pair of location pins.

14. The water sediment filter assembly of claim 13, wherein said upper section has a third port and a fourth port.

15. The water sediment filter assembly of claim 13, wherein when said first valve member is in a first position, said first central opening is aligned with said first port and said third central opening is aligned with said second port, permitting water to enter said first port and exit said second port after having passed through said screen member.

16. The water sediment filter assembly of claim 13, wherein when said first valve member is in a second position, said second central opening is in fluid communication with said first port, permitting flow of water into the first lower opening, and said third central opening is not aligned with said second port.

17. The water sediment filter assembly of claim 13, wherein when said first valve member is in a third position, no central port is aligned with said first port or said second port.

18. A water sediment filter assembly, comprising:
- a housing having an upper section and a lower section, wherein:
  - said upper section has a first port and a second port;
  - said lower section includes an open cavity;
  - said lower section is removably coupled to said upper section;
  - said lower section having a drain port;
- a valve cap coupled to said upper section, said valve cap includes five spaced apart spring biased balls;
- a pair of location pins positioned on said valve cap;
- a first valve member located in said upper section with a central section positioned at an intersection point, wherein:
  - said first valve member includes a stem portion;
- a screen member positioned in said cavity of said lower section, said screen member including a cavity section that is in fluid communication with said second lower opening;
- a second valve member coupled to said drain port; and
- a handle coupled to said stem portion of said first valve member, said handle having a portion that can be rotated between said pair of location pins to align with any one of said five spaced apart spring biased balls.

19. The water sediment filter assembly of claim 18, wherein said first valve member includes five central spaced apart openings.

20. The water sediment filter assembly of claim 19, wherein said first valve member includes at least one lower opening.

* * * * *